United States Patent
Wang et al.

(10) Patent No.: US 10,863,334 B2
(45) Date of Patent: Dec. 8, 2020

(54) NON-ORTHOGONAL MULTIPLE ACCESS TECHNIQUES FOR NARROWBAND INTERNET OF THINGS AND MACHINE TYPE COMMUNICATION

(71) Applicant: QUALCOMM Incorporated, San Diego, CA (US)

(72) Inventors: Renqiu Wang, San Diego, CA (US); Seyong Park, San Diego, CA (US); Alberto Rico Alvarino, San Diego, CA (US); Tingfang Ji, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 16/180,845

(22) Filed: Nov. 5, 2018

(65) Prior Publication Data

US 2019/0141499 A1    May 9, 2019

Related U.S. Application Data

(60) Provisional application No. 62/583,451, filed on Nov. 8, 2017.

(51) Int. Cl.
*H04W 4/20* (2018.01)
*H04W 4/70* (2018.01)
(Continued)

(52) U.S. Cl.
CPC ............... *H04W 4/70* (2018.02); *H04J 15/00* (2013.01); *H04L 5/0007* (2013.01);
(Continued)

(58) Field of Classification Search
CPC .... H04W 4/70; H04L 27/2601; H04L 5/0048; H04L 5/0021; H04L 5/0051;
(Continued)

(56) References Cited

U.S. PATENT DOCUMENTS

2010/0080139 A1* 4/2010 Palanki ................ H04L 1/0023
370/252
2012/0250802 A1* 10/2012 Okamoto ......... H04N 21/42607
375/340

(Continued)

FOREIGN PATENT DOCUMENTS

WO    WO-2017139005 A1    8/2017

OTHER PUBLICATIONS

Intel Corporation: "Link-level Evaluation Results of UL NOMA Schemes", 3GPP Draft, R1-1610918 Intel LLS_ULNOMA, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 18, 2016 (Oct. 18, 2016), XP051160379, 9 Pages, Retrieved from the Internet: URL:http://www.3gpp.org/ftp/tsg_ran/WG1_RL1/TSGR1_86b/Docs/ [retrieved on Oct. 18, 2016].

(Continued)

*Primary Examiner* — Ajay Cattungal
(74) *Attorney, Agent, or Firm* — Holland & Hart LLP

(57) ABSTRACT

Repeated signals for narrowband internet of things (NB-IoT) and machine type communication (MTC) may be transmitted using various non-orthogonal multiple access (NOMA) techniques. A user equipment (UE) may generate a set of modulated symbols associated with the data stream, spread the set of symbols using a spreading factor, and may subsequently apply a scrambling sequence to the set of symbols. The spread and scrambled symbols may be transmitted as a time domain waveform that includes one or more (Continued)

repetitions of a transmission time interval (TTI) or a resource unit (RU). Additionally, or alternatively, the UE may perform rate matching and apply the scrambling sequence to achieve the repetitions of the TTIs or RUs. In some cases, the UE may transmit a set of orthogonal pilot signals with the repetitions of the TTIs or RUs, where the pilot signals include different cyclically shifted versions of a base pilot signal.

30 Claims, 18 Drawing Sheets

(51) Int. Cl.
　　　*H04L 27/26*　　(2006.01)
　　　*H04L 5/00*　　(2006.01)
　　　*H04J 99/00*　　(2009.01)
　　　*H04L 27/20*　　(2006.01)

(52) U.S. Cl.
　　　CPC .......... *H04L 5/0021* (2013.01); *H04L 5/0044* (2013.01); *H04L 5/0048* (2013.01); *H04L 5/0051* (2013.01); *H04L 27/2601* (2013.01); *H04L 27/20* (2013.01); *H04L 27/2626* (2013.01)

(58) Field of Classification Search
　　　CPC . H04L 5/0044; H04L 5/0007; H04L 27/2626; H04L 27/20; H04J 15/00
　　　See application file for complete search history.

(56) References Cited

U.S. PATENT DOCUMENTS

| | | | | |
|---|---|---|---|---|
| 2013/0242889 | A1* | 9/2013 | Khoryaev | H04N 21/25841 370/329 |
| 2014/0071961 | A1* | 3/2014 | Nigam | H04W 72/042 370/336 |
| 2015/0036631 | A1* | 2/2015 | Yang | H04L 27/2601 370/329 |
| 2016/0205683 | A1* | 7/2016 | Quan | H04W 72/0446 370/280 |
| 2017/0338924 | A1* | 11/2017 | Islam | H04L 5/0053 |
| 2018/0167230 | A1* | 6/2018 | Motozuka | H04L 5/001 |
| 2019/0029031 | A1* | 1/2019 | Kumar | H04W 28/0278 |
| 2019/0036746 | A1* | 1/2019 | Hwang | H04L 1/0061 |
| 2019/0174547 | A1* | 6/2019 | Khoryaev | H04B 17/318 |
| 2019/0260528 | A1* | 8/2019 | Ko | H04L 1/1671 |

OTHER PUBLICATIONS

International Search Report and Written Opinion—PCT/US2018/059493—ISA/EPO—dated Feb. 13, 2019.

Qualcomm Incorporated: "Resource Spread Multiple Access", 3GPP Draft, R1-166359, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 22, 2016-Aug. 26, 2016, Aug. 21, 2016 (Aug. 21, 2016), XP051140179, 8 Pages, Retrieved from the Internet:URL:http://www.3gpp.org/ftp/Meetings_3GPP_SYNC/RAN1/Docs/ [retrieved on Aug. 21, 2016].

Sharp: "A Unified Framework for Discussing NOMA Schemes", 3GPP Draft, R1-154071, 3rd Generation Partnership Project (3GPP), Mobile Competence Centre, 650, Route Des Lucioles, F-06921 Sophia-Antipolis Cedex, France, vol. RAN WG1, No. Beijing, China, Aug. 24, 2015-Aug. 28, 2015, Aug. 23, 2015 (Aug. 23, 2015), XP051039399, pp. 1-7, Retrieved from the Internet:URL:http://www.3gpp.org/ftp/Meetings_3GPP_SYNC/RAN1/Docs/ [retrieved on Aug. 23, 2015].

* cited by examiner

NON-ORTHOGONAL MULTIPLE ACCESS TECHNIQUES FOR NARROWBAND INTERNET OF THINGS AND MACHINE TYPE COMMUNICATION

CROSS REFERENCES

The present Application for Patent claims benefit of U.S. Provisional Patent Application No. 62/583,451 by Wang et al., entitled "NON-ORTHOGONAL MULTIPLE ACCESS TECHNIQUES FOR NARROWBAND INTERNET OF THINGS AND MACHINE TYPE COMMUNICATION," filed Nov. 8, 2017, assigned to the assignee hereof, and expressly incorporated by reference herein.

BACKGROUND

The present disclosure relates to wireless communication, and more specifically to non-orthogonal multiple access (NOMA) techniques for narrowband Internet of things (NB-IoT) and machine type communication (MTC).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems.

These systems may employ technologies such as code division multiple access (CDMA), time division multiple access (TDMA), frequency division multiple access (FDMA), orthogonal frequency-division multiple access (OFDMA), or discrete Fourier transform-spread-orthogonal frequency-division multiplexing (DFT-S-OFDM). A wireless multiple-access communications system may include a number of base stations or network access nodes, each simultaneously supporting communication for multiple communication devices, which may be otherwise known as user equipment (UE). Communications systems may also take advantage of multiple antenna techniques for increased reliability or capacity. Multiple antenna techniques include, for example, transmit diversity and multiple-input multiple-output (MIMO) techniques. However, in some cases, multiple access techniques may be limited in the number of UEs that may simultaneously communicate on a set of system resources.

SUMMARY

The described techniques relate to improved methods, systems, devices, or apparatuses that support non-orthogonal multiple access (NOMA) techniques for narrowband internet of things (NB-IoT) and machine type communication (MTC) or enhanced MTC (eMTC). Generally, the described techniques provide for the transmission of repeated signals through the use of various NOMA techniques. For example, when transmitting a data stream, a user equipment (UE) may apply different resource spread multiple access (RSMA) techniques to achieve the repetition of a signal for MTC and/or NB-IoT communications. The UE may generate a set of modulated symbols associated with the data stream and may spread the set of symbols in accordance with a spreading factor. The UE may subsequently apply a scrambling sequence to the spread set of symbols, where the scrambling sequence may include a seed generation function that is non-linear to a slot index. The spread and scrambled symbols may be transmitted as a time domain waveform that includes one or more repetitions of a transmission time interval (TTI) or a resource unit (RU). Additionally, or alternatively, the UE may perform rate matching on the data stream and may apply the scrambling sequence to achieve the one or more repetitions of the TTIs or RUs. In some cases, the UE may transmit a set of orthogonal pilot signals with the one or more repetitions of the TTIs or RUs, where the pilot signals include different cyclically shifted versions of a base pilot signal.

A method of wireless communication is described. The method may include performing rate matching for a set of modulated symbols associated with a data stream for a transmission during a TTI, applying a scrambling sequence to the rate-matched symbols, generating a time domain waveform for the transmission of the scrambled and rate-matched symbols, and transmitting the time domain waveform to a receiver, where the transmitted time domain waveform may contain one or more repetitions of the TTI.

Some examples of the method described herein may further include processes, features, means, or instructions for transmitting a set of pilot signals as part of the time domain waveform, where respective pilot signals of the set of pilot signals may be different cyclically shifted versions of a base pilot signal based on a configured cyclic shift index.

Some examples of the method described herein may further include processes, features, means, or instructions for applying a time domain orthogonal cover code to the set of pilot signals based on a resource allocation for the transmission of the time domain waveform, and transmitting the time domain waveform using one or more spatial layers.

In some examples of the method described herein, the set of pilot signals may include demodulation reference signals (DMRSs). In some examples of the method described herein, the scrambling sequence may be a seed generation function non-linear to a slot index to the set of symbols.

In some examples of the method described herein, generating the set of modulated symbols may include modulating the data stream using $\pi/2$-binary phase-shift keying (BPSK). Some examples of the method described herein may further include processes, features, means, or instructions for identifying the set of pilot signals associated with the data stream, and transmitting the time domain waveform using one or more repetitions of the TTI and the set of pilot signals, where the respective pilot signals of the set of pilot signals are different cyclically shifted versions of a base pilot signal based on a cyclic shift index.

Some examples of the method described herein may further include processes, features, means, or instructions for determining a number of TTIs per transport block (TB) for transmitting the one or more repetitions of the TTI, the TB size used for a coarse alignment of the transmitted time domain waveform, identifying a configuration for a repetition period for the one or more repetitions of the TTI, where the repetition period may be temporally misaligned with another repetition period of another UE. Some examples of the method described herein may further include processes, features, means, or instructions for identifying a configuration for a repetition period and a TTI bundle size for the one or more repetitions of the TTI, where the TTI spans a subframe or an orthogonal frequency-division multiplexed (OFDM) symbol period.

Some examples of the method described herein may further include processes, features, means, or instructions for identifying a configuration for an RU size, a number of RUs, and a number of repetitions for one or more repetitions of an RU, where the TTI contains the number of RUs. Some examples of the method described herein may further include processes, features, means, or instructions for determining a number of TTIs per transport block (TB) for transmitting the one or more repetitions of the TTI, the TB size used for a coarse alignment of the transmitted time domain waveform.

In some examples of the method described herein, applying the scrambling sequence to the rate-matched symbols may include applying respective portions of the scrambling sequence to respective symbol groups of the set of symbols. In some examples of the method, described herein, the TTI spans one subframe or an orthogonal frequency-division multiplexed (OFDM) symbol period.

Some examples of the method described herein may further include processes, features, means, or instructions for spreading each symbol of the set of symbols prior to generating a frequency domain waveform, where the time domain waveform may be generated based on the frequency domain waveform. In some examples of the method described herein, the UE supports eMTC, or NB-IoT communications, or a combination thereof.

Some examples of the method described herein may further include processes, features, means, or instructions for identifying one or more time frequency resources for transmitting the time domain waveform without receiving a resource grant for the one or more time frequency resources.

In some examples of the method the time domain waveform contains a preamble portion and a data portion. Some examples of the method described herein may further include processes, features, means, or instructions for transmitting one or more DMRSs in the data portion of the time domain waveform.

Some examples of the method described herein may further include processes, features, means, or instructions for refraining from performing an initial access procedure for transmitting on the one or more time frequency resources, where the one or more time frequency resources are identified in an absence of timing advance information from a base station.

An apparatus for wireless communication is described. The apparatus may include a processor, memory in electronic communication with the processor, and instructions stored in the memory and executable by the processor to cause the processor to perform rate matching for a set of symbols associated with a data stream for a transmission during a TTI, apply a scrambling sequence to the rate-matched symbols, generate a time domain waveform for the transmission of the scrambled and rate-matched symbols, and transmit the time domain waveform to a receiver. The transmitted time domain waveform may contain one or more repetitions of the TTI.

Some examples the apparatus described herein may further include processes, features, means, or instructions for identifying a configuration for a repetition period for the one or more repetitions of the TTI, where the repetition period may be temporally misaligned with another repetition period of another UE. Some examples of the apparatus described herein may further include processes, features, means, or instructions for transmitting a set of pilot signals as part of the time domain waveform, where respective pilot signals of the set of pilot signals include different cyclically shifted versions of a base pilot signal based on a configured cyclic shift index. In some examples of the apparatus described herein, the set of pilot signals may contain DMRSs Some examples of the apparatus described herein may further include processes, features, means, or instructions for applying a time domain orthogonal cover code to the set of pilot signals based on a resource allocation for the transmission of the time domain waveform.

In some examples of the apparatus described herein, the scrambling sequence may be a seed generation function non-linear to a slot index to the set of symbols. Some examples of the apparatus described herein may further include processes, features, means, or instructions executable by the processor to determine a number of TTIs per transport block (TB) for transmitting the one or more repetitions of the TTI, the number of TTIs per TB used for a coarse alignment of the transmitted time domain waveform.

Some examples of the apparatus described herein may further include processes, features, means, or instructions for transmitting the time domain waveform using one or more spatial layers.

Some examples of the apparatus described herein may further include processes, features, means, or instructions for identifying one or more time frequency resources for transmitting the time domain waveform without receiving a resource grant for the one or more time frequency resources. Some examples of the method described herein may further include processes, features, means, or instructions for transmitting the time domain waveform on the one or more time frequency resources.

Another apparatus for wireless communication is described. The apparatus may include means for generating a set of modulated symbols associated with a data stream for a transmission during a transmission time interval (TTI), means for spreading each symbol of the set of modulated symbols in accordance with a spreading factor, means for applying a scrambling sequence to the spread symbols, means for generating a time domain waveform for the transmission of the scrambled and spread symbols; and means for transmitting the time domain waveform to a receiver, the transmitted time domain waveform comprising one or more repetitions of the TTI, wherein the transmission of the time domain waveform is synchronized with transmissions of other UEs.

A non-transitory computer-readable medium storing code for wireless communication is described. The non-transitory computer-readable medium storing code may include instructions executable by a processor to apply a scrambling sequence with a seed generation function non-linear to a slot index to a set of symbols associated with a data stream, identify a set of pilot signals associated with the data stream, generate a time domain waveform for a transmission of the scrambled symbols during a TTI, and transmit the time domain waveform to a receiver. The transmitted time domain waveform may contain one or more repetitions of the TTI and the set of pilot signals.

DETAILED DESCRIPTION

Figure 1:
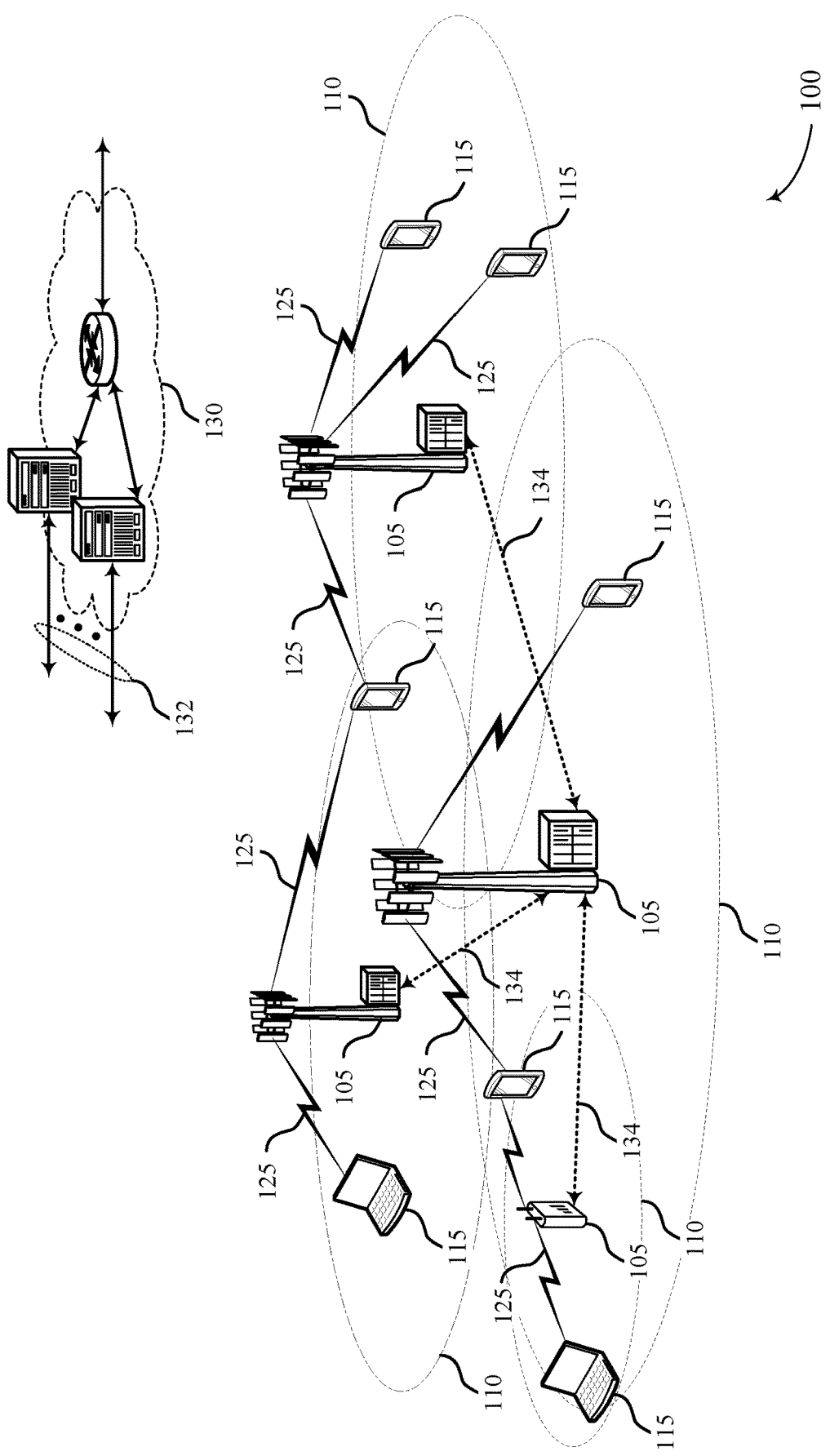
FIG. 1 illustrates an example of a system for wireless communication that supports NOMA techniques for NB-IoT and MTC in accordance with aspects of the present disclosure.

Some wireless communications systems may support multiple access techniques for multiple users by sharing available system resources (e.g., time, frequency, and power). Additionally, or alternatively, a base station and/or user equipment (UE) may be equipped with multiple antennas that enable multiple-input, multiple-output (MIMO) techniques. MIMO systems may employ T transmit antennas and R receive antennas, which may realize a capacity increase of min{T, R} over similar single antenna techniques. Such MIMO techniques may take advantage of multi-path environments, for example, to transmit multiple spatial layers carrying the same or different coded data. Accordingly, systems may utilize combinations of MIMO techniques and multiple access techniques (e.g., code division multiple access (CDMA), time division multiple access (TDMA), frequency division multiple access (FDMA), orthogonal frequency-division multiple access (OFDMA), etc.).

In some cases, non-orthogonal multiple access (NOMA) techniques may outperform orthogonal multiple access (OMA) techniques, such as in systems where MIMO techniques are employed. NOMA techniques may enable transmitting devices access to more system bandwidth, while simultaneously enabling a greater number of users to communicate on a set of time frequency resources. As an example, using OMA techniques, a resource block (RB) may be allocated to three UEs such that if each UE transmits using a single transmission antenna, three corresponding receiving antennas may be used at a receiver (e.g., a base station). Such examples may be representative of a 1×3 single-input, multiple-output (SIMO) transmission. By contrast, NOMA techniques may enable six UEs, each with a single antenna, to transmit on the RB, which may be representative of a 6×4 MIMO transmission.

An example of a NOMA technique that enables the recovery of multiple simultaneous transmissions includes resource spread multiple access (RSMA). RSMA techniques may utilize lower rate channel coding that spreads a transmitted signal across resources. Coding gains obtained from the channel coding may lead to robust transmissions, and also may be well suited for sporadic transmissions of small non-orthogonal data bursts. For example, RSMA techniques may be particularly beneficial in systems that support machine type communication (MTC), enhanced MTC (eMTC), narrowband Internet of Things (NB-IoT) communications, and the like. In such cases, signals from multiple transmitting devices may be recovered simultaneously, even in the presence of mutual interference.

As described herein, through the use of NOMA techniques such as RSMA, greater scheduling flexibility may be provided for multiple access by a large number of UEs, while also supporting robust communications with varying channel code rates. For example, spreading and scrambling in accordance with RSMA techniques may be applied to a data stream sent by a wireless device (e.g., a UE), where the spreading and scrambling may limit mutual interference from other transmitting devices. Such techniques may comply with a subframe structure utilized by eMTC and/or NB-IoT systems, and may further enable the repetition or spreading of signals described herein. Additionally, or alternatively, rate matching and scrambling using the RSMA techniques may utilize the repetition of signals for eMTC and NB-IoT communications. Such techniques may be used for synchronous transmissions by different UEs and may also be adapted for asynchronous transmissions in a system.

In some examples, a UE may transmit a pilot signal (e.g., a demodulation reference signal (DMRS)) with the repetitions of uplink data, where respective pilot signals may include a configurable cyclic shift index for respective instances of the pilot signal. That is, transmissions of the pilot signal from different UEs may have a different cyclic shift (e.g., as opposed to a fixed cyclic shift), where respective transmissions of the pilot signal may be orthogonal to each other. Additionally, or alternatively, a scrambling sequence applied to the data stream may use a seed generation function that is non-linear to a slot index, which may enhance communications by providing a low cross correspondence between transmissions by different UEs.

Aspects of the disclosure are initially described in the context of a wireless communications system. Examples are also provided which describe RSMA techniques and the repetition of signals using such techniques. In addition, process flows are provided to illustrate efficient communications through the use of NOMA techniques. Aspects of the disclosure are further illustrated by and described with reference to apparatus diagrams, system diagrams, and flowcharts that relate to NOMA techniques for NB-IoT and MTC.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices. Wireless communications system 100 may support the use of spreading and scrambling or rate matching and scrambling of a data stream to enable efficient eMTC and NB-IoT communications.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or another interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 25 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, MIMO communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or discrete Fourier transform (DFT)-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds (µs)). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communications system 100 may support the transmission of repeated signals through the use of various NOMA techniques. For example, when transmitting a data stream, a UE 115 may apply different RSMA techniques to achieve the repetition of a signal for MTC and/or NB-IoT communications. The UE 115 may generate a set of modulated symbols associated with the data stream and may spread the set of symbols in accordance with a spreading factor. The spreading may be achieved by repeating the same OFDM symbols multiple times, or by repeating the same modulation symbol multiple times prior to performing a time to frequency transform (e.g., DFT for a single-carrier waveform). The UE 115 may subsequently apply a scrambling sequence to the spread set of symbols, where the scrambling sequence may include a seed generation function that is non-linear to a slot index. The spread and scrambled symbols may be transmitted as a time domain waveform that includes one or more repetitions of a TTI (e.g., a subframe) or a resource unit (RU). Additionally, or alternatively, the UE 115 may perform rate matching on the data stream and then apply the scrambling sequence to achieve the one or more repetitions of the TTIs or RUs. In some cases, the UE 115 may transmit a set of orthogonal pilot signals with the repetitions of the TTIs or RUs, where the pilot signals include different cyclically shifted versions of a base pilot signal.

Figure 2A:
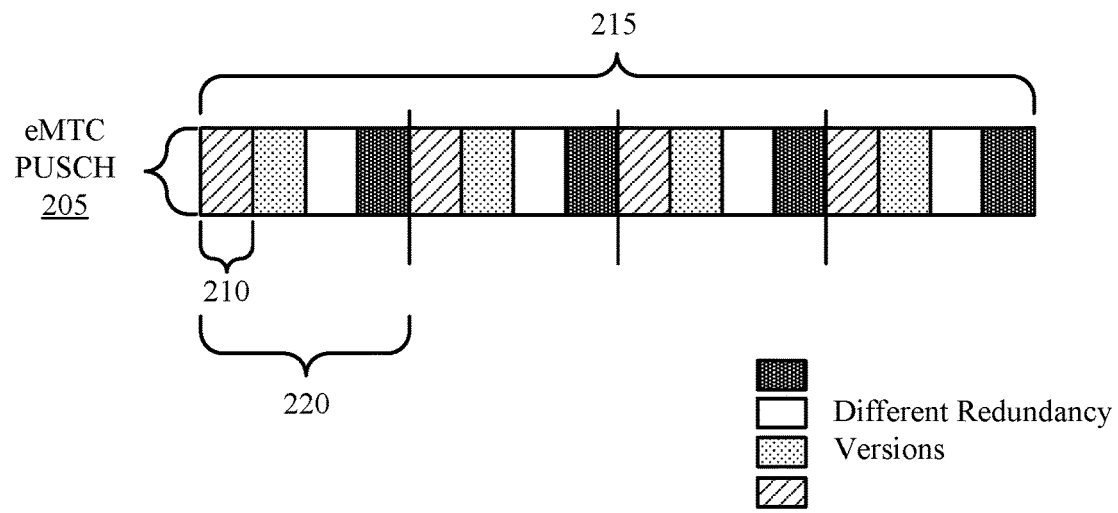
FIGS. 2A and 2B illustrate examples of physical uplink shared channel (PUSCH) transmissions in a system that supports NOMA techniques for NB-IoT and MTC in accordance with aspects of the present disclosure.
Figure 2B:
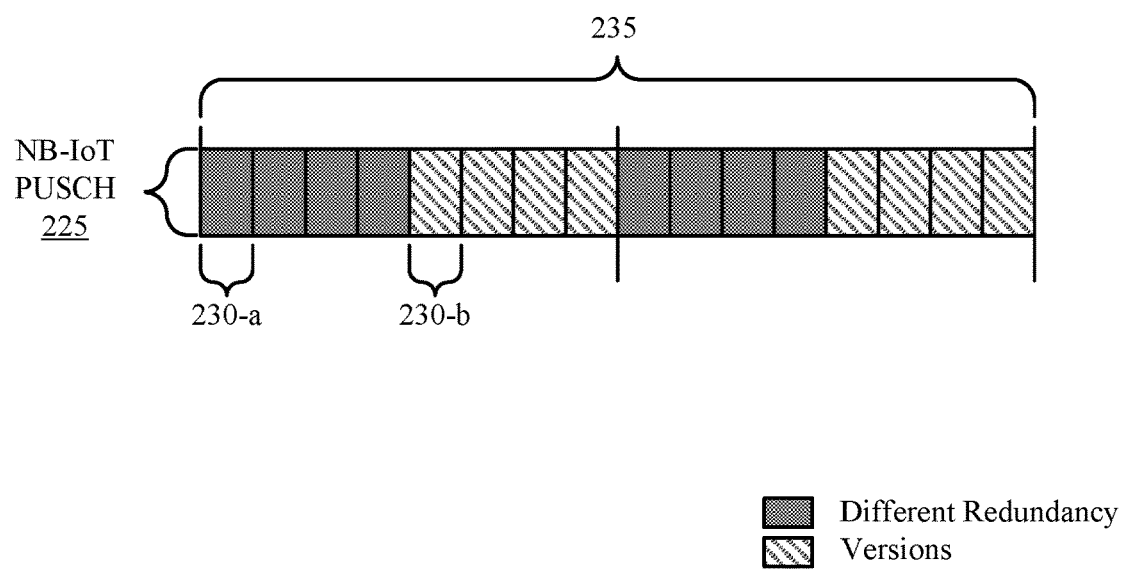

FIGS. 2A and 2B illustrate examples of PUSCH transmissions 201 and 202 in a system that supports NOMA techniques for NB-IoT and MTC in accordance with various aspects of the present disclosure. A wireless device, such as UE 115, may transmit PUSCH transmissions 201 and 202. PUSCH transmissions 201 and 202 may be examples of uplink signals repeated for eMTC and NB-IoT communications, respectively.

Some wireless systems may support redundancy schemes for uplink transmissions, such as uplink data sent from a UE 115 to a base station 105 (e.g., using PUSCH). Such schemes may be utilized in various eMTC and/or NB-IoT deployments, and may include repetitions of a same transmission (or different redundancy versions of the same transmission), which may enable robust uplink communications for devices with limited transmission capabilities. Additionally, or alternatively, wireless communications using the limited resources in these systems may benefit from the repetition of signals.

For instance, in a system that supports eMTC, resources may be allocated on a per-RB basis (e.g., a system bandwidth may contain six RBs, and PUSCH transmissions may be allocated to one or multiple RBs). Additionally, or alternatively, a sub-RB allocation for eMTC may be used (e.g., the PUSCH resource allocation includes one or multiple tones within an RB). In such cases, an uplink data signal may be repeated multiple times using one or more redundancy versions of the signal.

As an example, an eMTC PUSCH 205 may be transmitted over multiple TTIs 210 (e.g., subframes). Additionally, a TTI bundle 215 may include TTIs 210 carrying different redundancy versions of eMTC PUSCH 205. For example, TTI bundle 215 may include 16 TTIs 210 used for multiple repetitions 220 of eMTC PUSCH 205. Each repetition 220 may use different redundancy versions for eMTC PUSCH 205, for example, where four redundancy versions may be repeated four times (e.g., each repetition 220 includes four TTIs 210 for respective redundancy versions).

In another example, NB-IoT systems may allocate resources on a sub-RB basis, where the system bandwidth may include one RB (e.g., 200 kHz). Such systems may additionally allocate PUSCH resources to tones within the RB, and may further support cross-subframe code/rate matching. In such cases, there may be a configurable period of repetition for different redundancy versions of a signal.

An NB-IoT PUSCH 225 may be transmitted over multiple resource units (RUs) 230. The number of repetitions of NB-IoT PUSCH 225 may be configurable, where a number of redundancy versions of the signal may be transmitted on RUs 230. A size of each RU 230 may also be configurable, and may be equivalent to one or more TTIs 210 (e.g., such as one or more TTIs 210). As illustrated in PUSCH transmission 202, one RU 230 may be equivalent to a subframe; however, other RU sizes are possible.

To support a redundancy scheme for NB-IoT PUSCH 225, an RU bundle 235 may include multiple RUs 230 (e.g., N RUs 230). As illustrated, RU bundle 235 may include 16 RUs 230, where the RU size is that of a subframe. RU bundle 235 may accordingly include eight repetitions of two RUs 230 (e.g., N=2, where the RUs include RU 230-a and RU 230-b). In the present example, a first set of four repetitions of RU 230-a may be followed by a first set of four repetitions of RU 230-b, and a second set of four repetitions of RU 230-a may be followed by a second set of four repetitions of RU 230-b, and so forth. However, in other examples, any number RUs 230 (or different redundancy versions) may be used for repetitions of NB-IoT PUSCH 225. That is, different UEs 115 may configure N RUs 230 for various repetitions. In general, if the number of repetitions for the group of N RUs is greater than four, the first four repetitions of RU 230-a may be transmitted temporally first, and may be followed by the first four repetition of RU 230-b, until the first four repetitions of a temporally last RU 230 in a group of N RUs is transmitted. Subsequently, the second four repetitions of RU 230-a may be transmitted, and so on, until all repetitions of the N RUs are transmitted.

In some cases, eMTC and/or NB-IoT systems may be associated with relatively low data rates. For example, eMTC and NB-IoT devices may have a relatively small form factor, and may have a simplified construction with limited components (e.g., a limited power amplifier, a limited number of antennas, etc.). Additionally, due to relatively small system bandwidth, a low channel code rate may be used with repetitions of transmitted signals, as described herein. The number of UEs 115 in such system may also be relatively high. For example, there may be a relatively dense concentration of eMTC or NB-IoT devices that communicate with a cell (e.g., such as a large number of connected devices in a factory).

Some multiple access techniques may not sufficiently support a large number of UEs 115 while also supporting efficient communications with low spectral efficiency, such as in eMTC and NB-IoT systems. For instance, the number of UEs 115 that may simultaneously communicate on a set of resources using OMA techniques may be limited. In such cases, even when utilizing modulation and coding techniques that enable spreading of a signal over multiple resources, the use of, for example, orthogonal matrices may limit the maximum number of users that may communicate on a set of resources without experiencing mutual interference. As an example, some OMA techniques may spread a signal using an orthogonal cover code (OCC). Such techniques, however, may be limited in cases where a matrix that ensures mutual orthogonality between a large number of different users (e.g., more than four different UEs 115) is absent.

As described in further detail below and through the use of NOMA techniques such as RSMA, a large number of UEs 115 may gain greater scheduling flexibility for multiple access. Such techniques may also support robust communications with varying channel code rates. In an example, spreading and scrambling in accordance with RSMA techniques may be applied to a data stream sent by a wireless device (e.g., a UE 115), where the spreading and scrambling may limit mutual interference from other transmitting devices. Such techniques may comply with a subframe structure utilized by eMTC and/or NB-IoT systems, and may further enable the repetitions of signals described herein. Additionally, or alternatively, rate matching and scrambling using the RSMA techniques may enable signal repetition for eMTC and NB-IoT communications. Such techniques may be used for synchronous transmissions by different UEs 115, and may also be adapted for asynchronous transmissions in a system.

In some examples, UEs 115 may transmit a pilot signal (e.g., a DMRS) with the repetitions of uplink data, where respective pilot signals may include a configurable cyclic shift index for respective repetitions of the pilot signal. That is, each transmission of the pilot signal may have a different cyclic shift (e.g., as opposed to a fixed cyclic shift), where respective transmissions of the pilot signal may be orthogonal to each other. Additionally, or alternatively, a scrambling sequence applied to the data stream may use a seed generation function that is non-linear to a slot index, for example, where scaling the slot index by a UE-specific parameter cell radio network temporary identifier (C-RNTI). Accordingly, such techniques may enhance communications by providing a low cross correspondence between transmissions by different UEs 115.

Figure 3A:
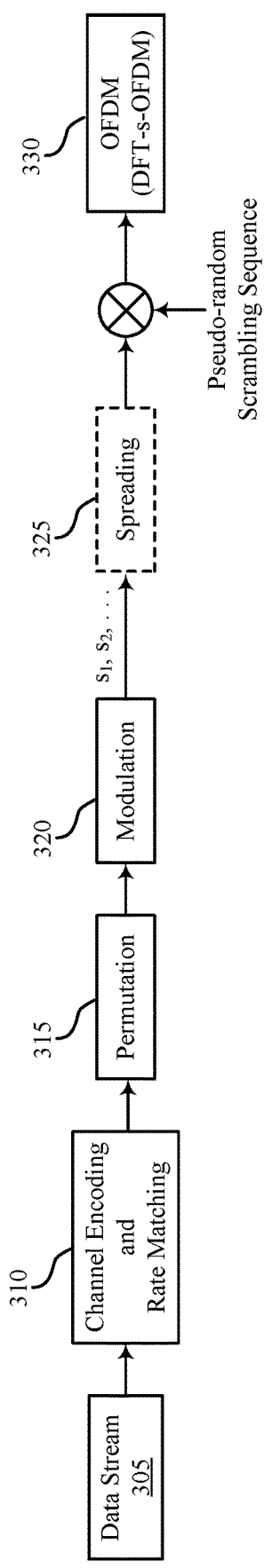
FIGS. 3A and 3B illustrate examples of single layer and multiple layer resource spread multiple access (RSMA) techniques that support NOMA techniques for NB-IoT and MTC in accordance with aspects of the present disclosure.
Figure 3B:
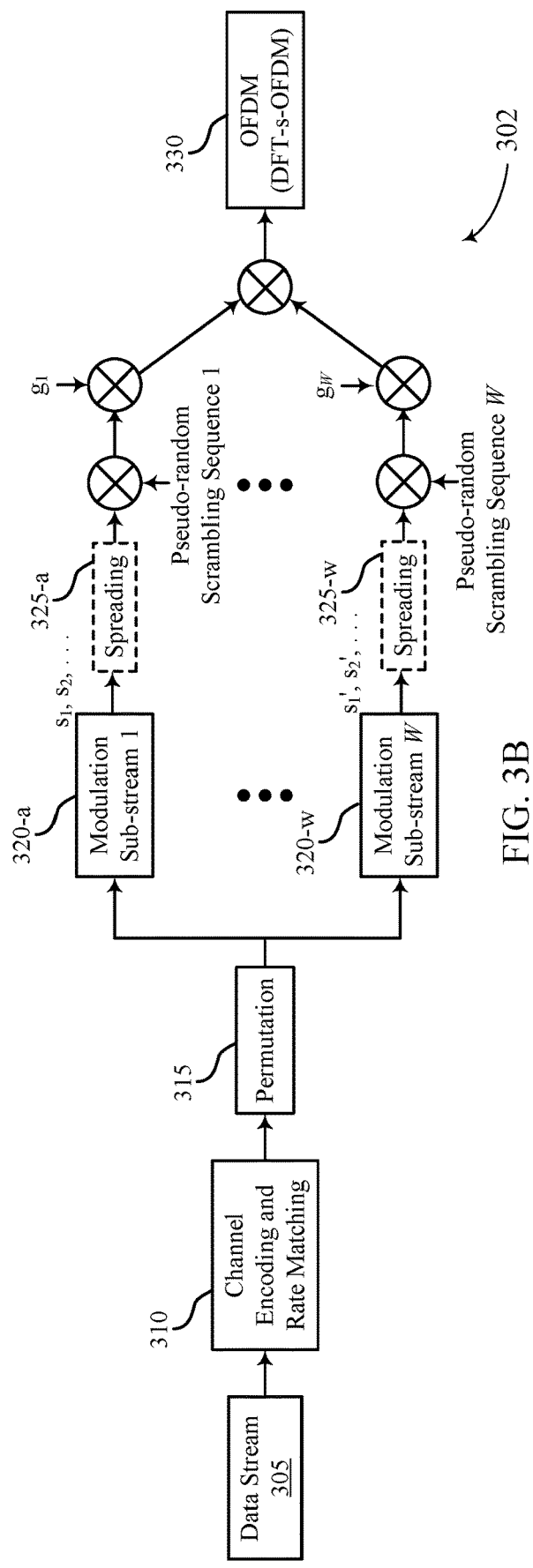

FIGS. 3A and 3B illustrate examples of single-layer RSMA techniques 301 and multiple-layer RSMA techniques 302 that support NOMA techniques for NB-IoT and MTC in accordance with various aspects of the present disclosure. In some examples, single-layer RSMA techniques 301 and multiple-layer RSMA techniques 302 may implement aspects of wireless communications system 100. For example, a wireless device such as UE 115 or a base station 105, as described with reference to FIG. 1, may implement single-layer RSMA techniques 301 and multiple-layer RSMA techniques 302. Single-layer RSMA techniques 301 and multiple-layer RSMA techniques 302 may support the use of spreading and scrambling or rate matching and scrambling of a data stream to enable efficient eMTC and NB-IoT communications.

A wireless device may prepare either single-layer RSMA modulated data stream or multiple-layer RSMA modulated data streams. As an example, for a given data stream 305 comprising a number of bits, the data stream 305 may be encoded (e.g., using a turbo code, a low-density parity-check (LDPC) code, etc.) and rate matched at 310. In some examples, and as described herein, the rate matching at 310 may result in repetitions of an uplink signal that may be used for efficient eMTC and NB-IoT communications. For example, a combination of rate matching and scrambling of symbols may enable different repetitions or configurations of uplink data sent by a UE 115. In some cases, the rate matching may be configured such that a number of TTIs within transport blocks used by different UEs 115 is the same, enabling a loose alignment of transmissions by the different UEs 115.

At 315, a permutation may be applied such that the encoded and rate matched data stream 305 may be randomized (e.g., relative to other wireless devices). Following the permutation at 315, a modulated set of symbols may be generated at 320. Here, data stream 305 may be modulated using various modulation schemes (e.g., QPSK, 16-QAM, etc.). In some examples, data stream 305 may be multiplexed using π/2-binary phase-shift keying (PB SK), which may enable a lower peak to average power ratio modulation scheme for transmissions.

With single-layer RSMA techniques 301 illustrated in FIG. 3A, a modulated set of symbols (e.g., $s_1, s_2, \ldots$) may be generated for subsequent multiplexing with a pseudo-random scrambling sequence. In some examples, prior to multiplexing with the pseudo-random scrambling sequence, the set of modulated symbols may be optionally spread at 325, which may enable the repetition of a signal over multiple resources. For example, the combination of spreading at 325 with the subsequent scrambling may result in a waveform that enables repetitions of PUSCH that may also match the frame structure of eMTC and/or NB-IoT systems.

In some cases, the spreading of the set of symbols may be based on a spreading factor, where the spreading factor may be an integer value, and may represent a degree by which the signal is spread over a number of TTIs. For example, when the spreading factor is equal to 1, there may be no spreading of the set of symbols. Alternatively, with a spreading factor equal to 4, the symbols $s_1, s_2, \ldots$ may be spread over symbols $s_1, s_1, s_1, s_1, s_2, s_2, s_2, s_2$, and so forth.

The modulated symbols (or the spread symbols) may be multiplexed with a scrambling sequence to reduce mutual interference between transmitting devices. In such cases, each symbol of the set of symbols may be scrambled using a segment or a portion of a pseudo-random scrambling sequence. For example, a first symbol (such as a symbol that has been optionally spread at 325) may be multiplexed with a first portion of a larger scrambling sequence. A second symbol may be similarly scrambled using a second portion of the larger scrambling sequence. Accordingly, a resulting waveform may include groups of symbols that are scrambled using different portions of the scrambling sequence.

After multiplexing the symbols with the scrambling sequence, the wireless device may generate a time domain waveform for a transmission. For example, a time to frequency domain transform (e.g., a discrete Fourier transform (DFT)) may be performed prior to a frequency to time domain transform (e.g., an inverse fast Fourier transform (IFFT)). At 330, the time domain waveform may then be mapped to different tones for transmission using OFDM or DFT-s-OFDM. The wireless device may then transmit the modulated streams to a receiver.

In the case of multiple-layer RSMA techniques 302 shown in FIG. 3B, multiple-layer operation may further enhance the randomization of interference between transmitting devices. For example, there may be modulation of multiple sub-streams from data stream 305 (e.g., modulation of W sub-streams at 320-$a$ through 320-$w$). In some cases, the wireless device may map the data sub-streams to a configurable number of RSMA layers (e.g., for transmission using MIMO techniques). As described herein, the modulated symbols of respective sub-streams may optionally be spread at 325-$a$ through 325-$w$ prior to being multiplexed with respective pseudo-random scrambling sequences. In some cases, different scaling factors (e.g., $g_1$ through $g_w$) may also be applied to each of the sub-streams. The sub-streams may then be synchronized and combined (e.g., added), and a time domain waveform may be generated for transmission. In some cases, the time domain waveform may be transmitted using multiple spatial layers, for example, using one or more antennas in accordance with MIMO techniques.

Figure 4:
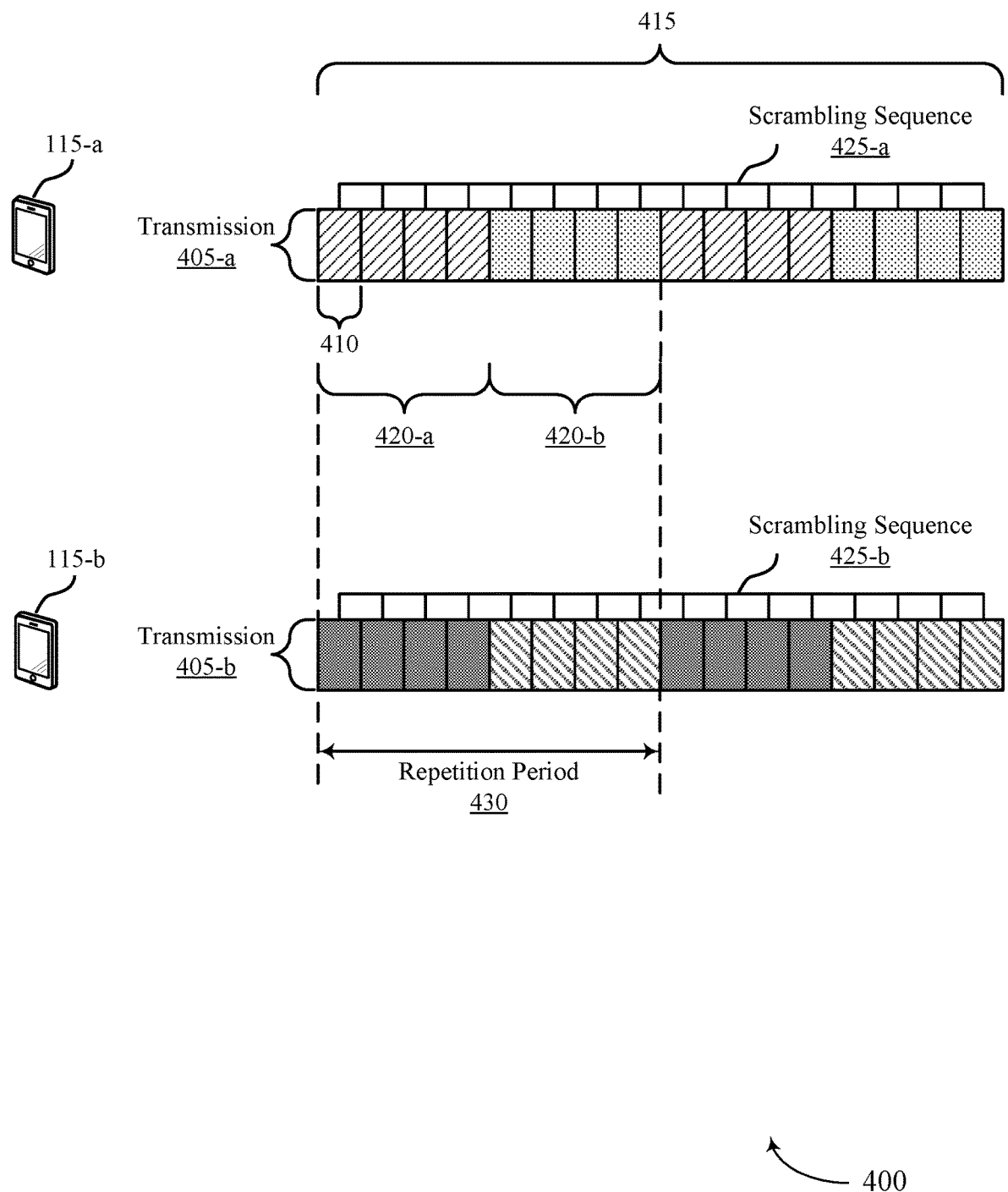
FIGS. 4 through 6 illustrate examples of data transmissions in a system that supports NOMA techniques for NB-IoT and MTC in accordance with aspects of the present disclosure.

FIG. 4 illustrates an example of a data transmissions 400 in a system that supports NOMA techniques for NB-IoT and MTC in accordance with various aspects of the present disclosure. In some examples, data transmissions 400 may implement aspects of wireless communications system 100. For example, a UE 115-$a$ and UE 115-$b$ may transmit separate time domain waveforms of a data stream using NOMA techniques in an eMTC or NB-IoT system, where UE 115-$a$ and UE 115-$b$ may be examples of the corresponding devices described with reference to FIG. 1. In such cases, UE 115-$a$ and UE 115-$b$ may be examples of eMTC or NB-IoT devices in communication with a base station 105 or another wireless device. Data transmissions 400 may be an example of spreading and scrambling of a data stream using RSMA techniques for eMTC or NB-IoT communications.

As described above, the use of RSMA techniques may enable multiple users to simultaneously communicate on a set of system resources. For example, at least UE 115-a and UE 115-b may concurrently communicate in the same system using the RSMA techniques described with reference to FIGS. 3A and 3B. In some cases, more than four UEs 115 may transmit on a same set of resources using such techniques. For instance, using a spreading factor of four, six UEs 115 may simultaneously transmit using NOMA transmissions. Additionally, UE 115-a and UE 115-b may generate a waveform for transmission to a receiver (e.g., a base station 105) which may include one or more repetitions of an uplink signal (e.g., a transmission of PUSCH). While the repetitions illustrated in FIG. 4 may represent the redundancy schemes used for NB-IoT transmissions, it is understood that the application of the described RSMA techniques may also achieve redundancy used for eMTC transmissions (e.g., as illustrated in FIG. 2A).

UE 115-a may send a time domain waveform transmission 405-a to a base station 105 and UE 115-b may simultaneously send a time domain waveform transmission 405-b to the same base station 105. The transmissions 405 may include multiple RUs 410 (or TTIs) within a bundle 415, where different redundancy versions of a same signal may be transmitted across different RUs 410. That is, there may be repetitions 420-a of a first RU 410 and repetitions 420-b of a second RU 410 for each UE 115. Different numbers of RUs 410 (e.g., N RUs 410 or TTIs) and repetitions of the N RUs 410 may be configured. Additionally, each UE 115 may apply different scrambling sequences 425 (e.g., 425-a and 425-b) to the symbols that make up the respective transmissions 405. As described herein, a different portion of the scrambling sequence 425 may be multiplexed with different groups of symbols associated with a data stream. In some examples, the length of the code used for RSMA may support the multiplexing of eight UEs 115 on a single set of resources. Thus, the combined spreading and scrambling of the data stream may reduce or eliminate any mutual interference between the transmissions by multiple UEs 115, including UE 115-a and UE 115-b (and other UEs 115 simultaneously transmitting using the same RSMA techniques).

In some examples, the transmissions 405 of the respective waveforms by UE 115-a and UE 115-b for NB-IoT communications may be synchronized. In such cases, both UEs 115 may be configured with a same RU size, a same number of RUs 410 (e.g., a same value of N), and a same repetition number. Additionally, or alternatively, for eMTC communications by UE 115-a and UE 115-b, a same bundle size with a same spreading factor may be configured for both UEs 115 (e.g., four repetitions with equivalent spreading every four TTIs). The UEs 115 may also be configured to start transmissions 405 at a same time. These configurations may ensure that a repetition period 430 for both UE 115-a and UE 115-b are temporally aligned, and the described spreading and scrambling techniques may support synchronous transmissions by multiple UEs 115. In some cases, a loose alignment of repetition period 430 may be achieved when a total number of transmitted TTIs per transport block is the same for the respective transmissions 405. In some examples, the channel carrying the transmission 405 (e.g., PUSCH) may vary over time. However, as a benefit of the described RSMA techniques, this variation in the channel may not impact a receiver, which may enable efficient decoding of the received signals from different UEs 115. That is, RSMA techniques may have a low sensitivity to channel variations over time.

In some cases, the spreading may occur on a sub-frame level, where the symbols of a data stream may be spread over a subframe. Additionally, or alternatively, the spreading may be on a symbol level, where the data stream may be spread over an OFDM symbol period. In such cases, UEs 115 may utilize symbol level repetition schemes, which may enable more granular control of transmission redundancy. In other examples, the spreading may be performed prior to a time to frequency transform of the symbols of a data stream. For example, spreading of the symbols may occur prior to a DFT and before the transmissions 405 are generated.

In some cases, a UE 115 may transmit a pilot signal (e.g., a DMRS) with the transmitted time domain waveform. For example, the UE 115 may transmit one or more pilot signals as part of a time domain waveform transmission 405. The one or more pilot signals may be orthogonal to each other, and may utilize a cyclically shifted version of a base pilot signal. The cyclically shifted versions of the pilot signal may be based on a dynamic or configurable cyclic shift index. Accordingly, a different cyclic shift may be used for respective transmissions of the pilot signal, which may further enable collision avoidance for simultaneous transmissions by multiple UEs 115. In some cases, the cyclic shifts may be combined with a time domain OCC for some resource allocations, such as sub-RB allocations (e.g., PUSCH transmissions over a number of tones). In some cases, the time domain waveform transmissions 405 may be transmitted over multiple spatial layers, which may enhance spectral efficiency of the transmissions 405 by respective UEs 115.

Figure 5:
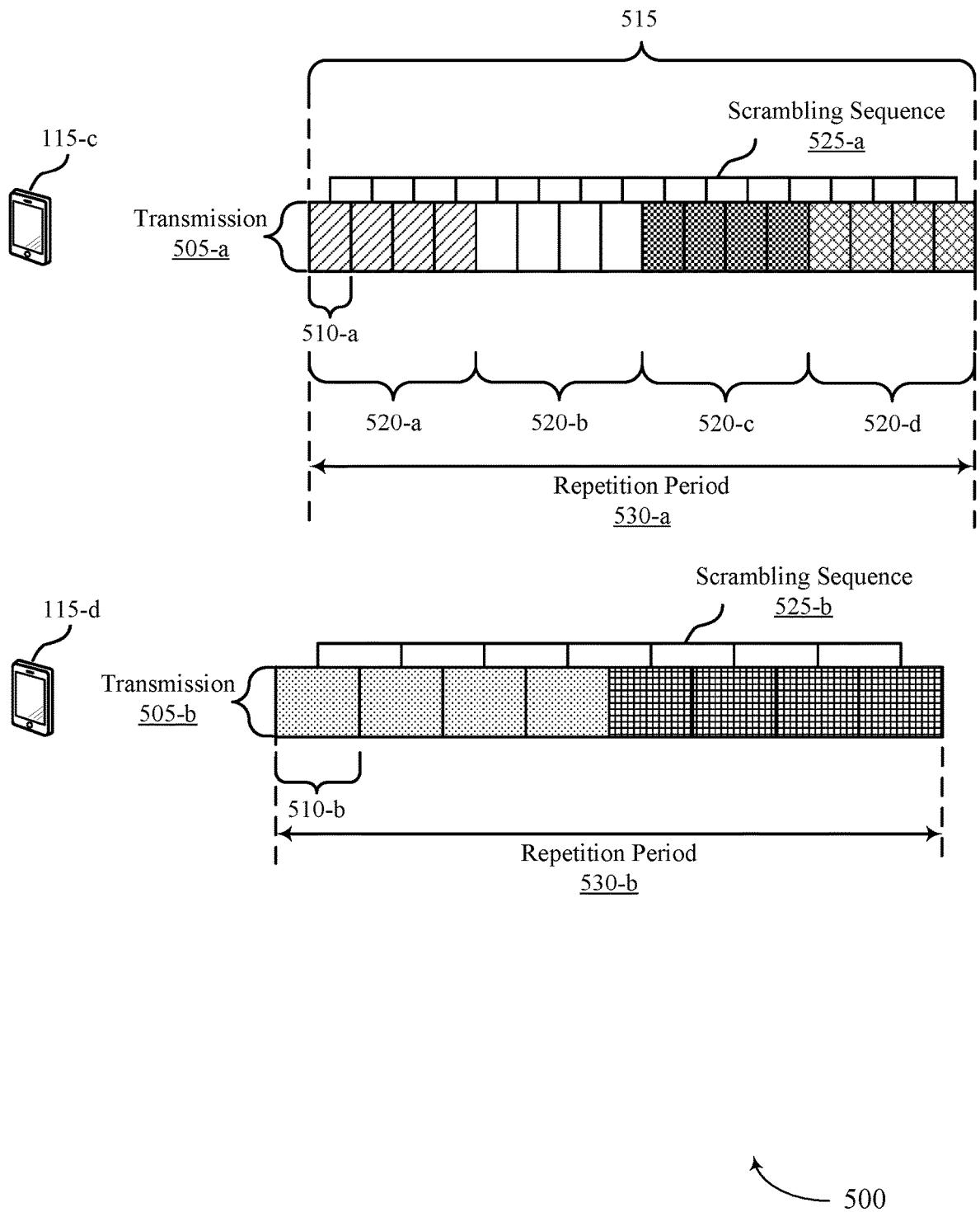

FIG. 5 illustrates an example of data transmissions 500 in a system that supports NOMA techniques for NB-IoT and MTC in accordance with various aspects of the present disclosure. In some examples, data transmissions 500 may implement aspects of wireless communications system 100. For example, a UE 115-c and UE 115-d may transmit separate waveforms using NOMA techniques in an eMTC or NB-IoT system, where UE 115-c and UE 115-c may be examples of the corresponding devices described with reference to FIG. 1. In such cases, UE 115-c and UE 115-c may be examples of eMTC or NB-IoT devices in communication with a base station 105 or another wireless device. Data transmissions 500 may be an example of rate matching and scrambling of a data stream using RSMA techniques for eMTC or NB-IoT communications.

As described herein, the use of RSMA techniques may enable multiple users to simultaneously communicate on a set of system resources. For example, at least UE 115-c and UE 115-d may concurrently communicate in the same system using the RSMA techniques described with reference to FIGS. 3A and 3B. In some cases, more than four UEs 115 may transmit on a same set of resources using such techniques. For instance, using a spreading factor of four, six UEs 115 may simultaneously transmit using NOMA transmissions. Additionally, UE 115-c and UE 115-d may generate a waveform for transmission to a receiver (e.g., a base station 105) that includes one or more repetitions of an uplink signal (e.g., a transmission of PUSCH).

In some cases, a wireless device may perform rate matching on a data stream to achieve the repetition of a transmitted signal, which may concurrently be used with the scrambling of symbols associated with the data stream. As illustrated in data transmissions 500, UE 115-c may send a time domain waveform transmission 505-a to a base station 105 and UE 115-d may simultaneously send a time domain waveform transmission 505-b to the same base station 105 on system resources. The transmissions 505 may include multiple RUs 510 (or TTIs) within a bundle 515, where different redundancy versions of a same signal may be transmitted across this different RUs 510. For instance, for UE 115-c there may be repetitions 520-a of a first RU 510, repetitions 520-b of a second RU 510, repetitions 520-c of a third RU 510, and so on. UE 115-d may have a different number of repetitions of a different number N RUs 510. That is, different numbers of RUs 510 (or TTIs) and a different number of repetitions may be configured for different UEs 115.

In some cases, UE 115-c and UE 115-d may also use different size RUs 510. For instance, a first RU 510-a configured for UE 115-c may be shorter than a second RU 510-b configured for UE 115-d. In such cases, RU 510-a may be equivalent to a subframe and RU 510-b may be equivalent to two subframes, but other RU sizes are possible. Additionally, each UE 115 may apply different scrambling sequences 525 (e.g., 525-a and 525-b) to the symbols that make up the respective transmissions 505. While the repetitions illustrated in FIG. 5 may represent the redundancy schemes used for NB-IoT transmissions, it is understood that the application of the described RSMA techniques may also achieve redundancy used for eMTC transmissions (e.g., as illustrated in FIG. 2A).

As described herein, a different portion of each scrambling sequence 525 may be multiplexed with different groups of symbols associated with respective data streams (or sub-streams). Additionally, the scrambling sequences 525 may be a scrambling sequence with a seed generation function that is non-linear to a slot index. Thus, the combined rate matching and scrambling of the data stream may reduce or eliminate any mutual interference between the transmissions by multiple UEs 115, including UE 115-a and UE 115-b (and other UEs 115 simultaneously transmitting using the same RSMA techniques).

In cases where UE 115-c and UE 115-d are configured with different RU sizes, or a different number of RUs 510 (e.g., a different value of N RUs 510), or a different repetition number, or a different transmission time, or any combination thereof. In such cases, the signals from respective UEs 115 may be temporally misaligned. That is, repetition periods 530 for different UEs 115 may be asynchronous (e.g., not aligned in time), where a repetition period 530-a for UE 115-c may start (or end) at a different time than a repetition period 530-b for UE 115-d. However, a loose alignment may be achieved if the total number of transmitted subframes per transport block is the same for each UE 115. Additionally, in some cases, the misalignment of the repetition periods may have varying impact on a receiver using different signal detection schemes, such as match filter and successive interference cancellation (SIC) schemes which may have little impact on a receiver, or match filter and elementary signal estimator (ESE) schemes, which may have slightly increased impact on the receiver due to complexity.

In some cases, a UE 115 may transmit a pilot signal with the transmitted time domain waveform. For example, one or more pilot signals (e.g., DMRSs) may be transmitted as part of a time domain waveform transmission 505. The one or more DMRSs may be mutually orthogonal, and may utilize a cyclically shifted version of a base pilot signal. The cyclically shifted versions of the DMRSs may be based on a dynamic or configurable cyclic shift index such that a different cyclic shift is used for each cyclically shifted version of the DMRS. In some cases, the cyclic shifts may be combined with a time domain OCC for some resource allocations, such as sub-RB allocations. In some cases, UEs 115 may send the time domain waveforms transmissions 505 over multiple spatial layers, which may enhance spectral efficiency of the transmissions 505 by respective UEs 115.

Figure 6:
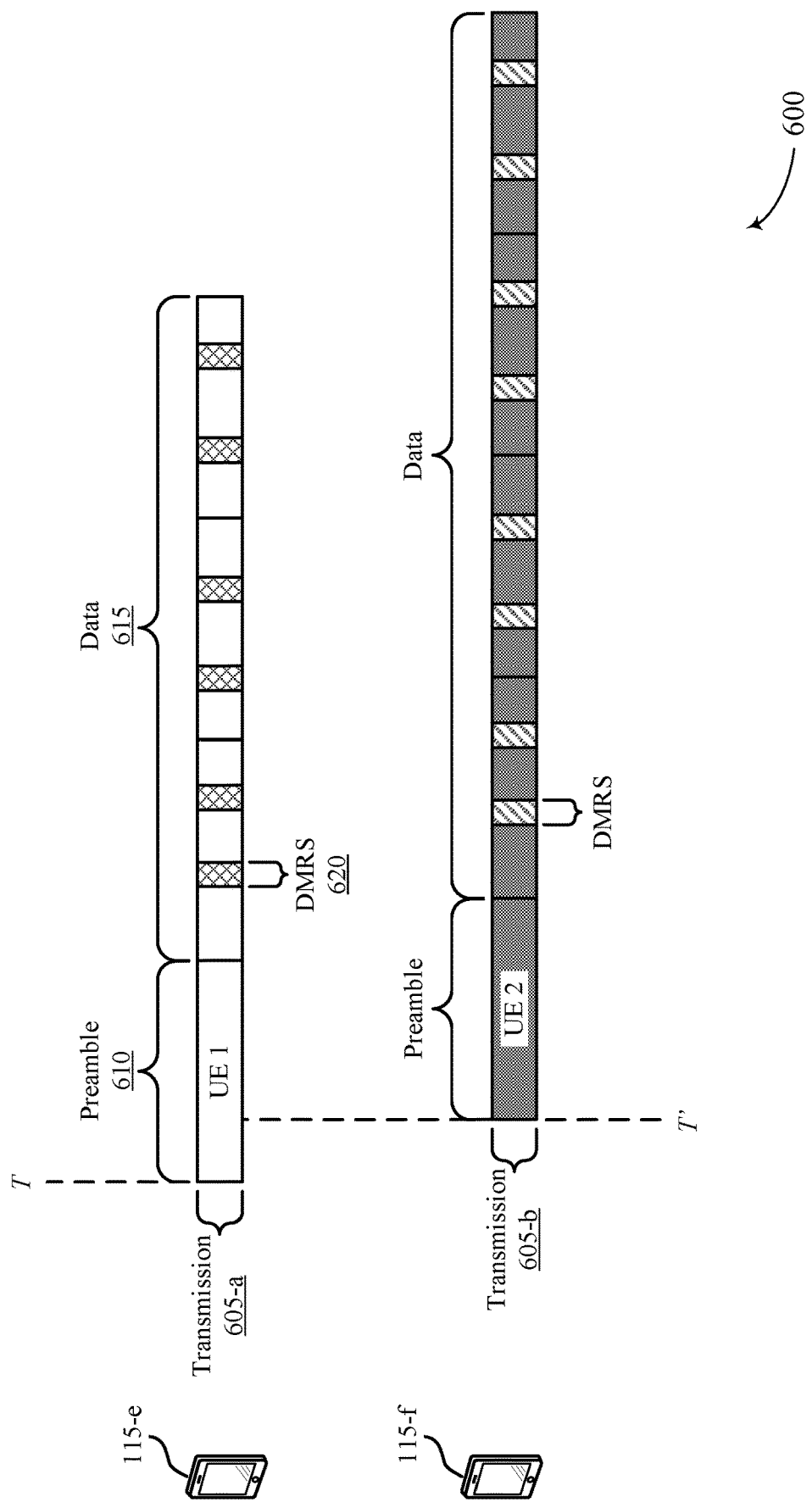

FIG. 6 illustrates an example of data transmissions 600 in a system that supports NOMA techniques for NB-IoT and MTC in accordance with various aspects of the present disclosure. In some examples, data transmissions 600 may implement aspects of wireless communications system 100. For example, a UE 115-e and UE 115-f may transmit separate waveforms using NOMA techniques in an eMTC or NB-IoT system, where UE 115-e and UE 115-f may be examples of the corresponding devices described with reference to FIG. 1. In such cases, UE 115-e and UE 115-f may be examples of eMTC or NB-IoT devices in communication with a base station 105 or another wireless device. Data transmissions 600 may be an example of NOMA techniques for asynchronous eMTC and/or NB-IoT communications, where NOMA is used in grant-free transmissions without initial access.

The described techniques may enable multiple UEs 115 to simultaneously communicate on a set of system resources. For example, at least UE 115-e and UE 115-f may concurrently communicate in the same system using the RSMA techniques described with reference to FIGS. 3A and 3B. In some cases, more than four UEs 115 may transmit on a same set of resources using such techniques. Additionally, UE 115-e and UE 115-f may generate a waveform for transmission to a receiver (e.g., a base station 105) that includes one or more repetitions of an uplink signal (e.g., a transmission of PUSCH).

In some cases, UE 115-e and UE 115-f may access time frequency resources without first receiving a resource grant from a base station 105. For instance, UE 115-e and UE 115-f may opportunistically or randomly access a set of resources for sending a time domain waveform transmission 605-a and transmission 605-b, respectively. In such cases, the UEs 115 may send the transmissions 605 without performing initial access procedures and receiving a resource grant as well as a timing advance command, which may save power and reduce communications delay. As a result of the unscheduled transmissions and a lack of a timing advance received from a serving cell, transmission 605-a and transmission 605-b may be misaligned. For example, transmission 605-a by UE 115-e may start at time T, whereas transmission 605-b by UE 115-f may start at time T'.

However, the NOMA techniques described herein may not be affected by timing offsets, and may enable efficient communications for asynchronous communications by multiple UEs 115 in the presence of asynchronous transmissions. Accordingly, UE 115-e and UE 115-f may generate the time domain waveform sent in transmissions 605 through the use of the rate matching and scrambling RSMA techniques as described with reference to FIG. 5. For example, UE 115-e may generate the time domain waveform for transmission 605-a by performing rate matching to obtain a number of repetitions of a signal. UE 115-e may subsequently scramble the rate matched symbols to reduce mutual interference with other UEs 115 (such as UE 115-f) whose transmissions may overlap in time with transmission 605-a.

In some examples, each asynchronous transmission 605 by UE 115-e and UE 115-f may include a preamble portion 610 and a data portion 615. A base station 105 may use the preamble portion 610 in each transmission 605-a and 605-b to detect the presence of a signal transmitted by the corresponding UE 115. The base station 105 may use the preamble portion 610 to obtain a rough timing estimate for transmissions by the respective UE 115. Additionally, pilot signals such as DMRS 620 may be added to data portion 615 for channel estimation and tracking. Additionally, or alternatively, the NOMA techniques described herein may be used for control channel transmissions (e.g., a 1-bit physical uplink control channel (PUCCH) transmission carrying HARQ feedback).

Figure 7:
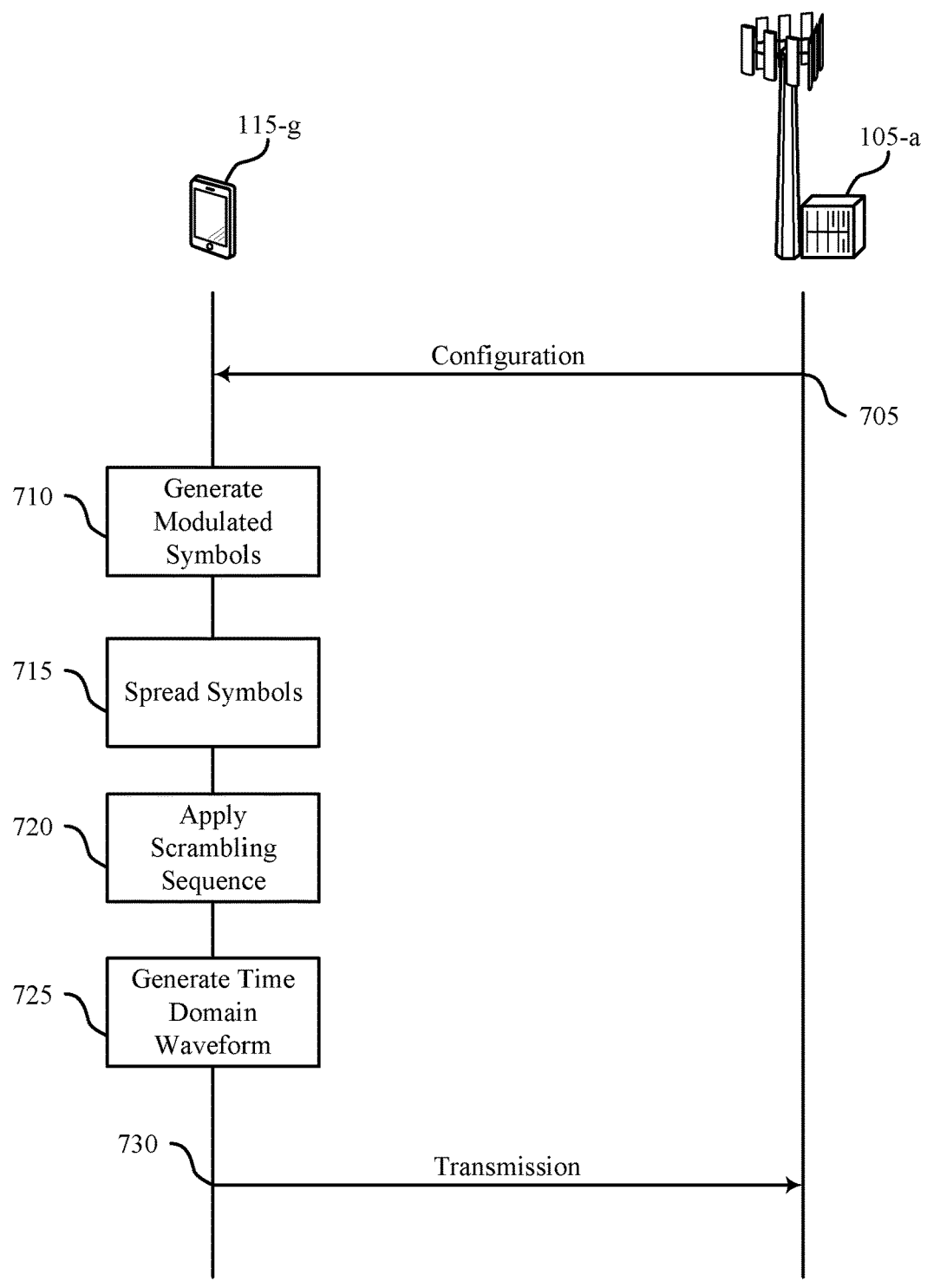
FIGS. 7 and 8 illustrate examples process flows in a system that supports NOMA techniques for NB-IoT and MTC in accordance with aspects of the present disclosure.

FIG. 7 illustrates an example of a process flow 700 in a system that supports NOMA techniques for NB-IoT and MTC in accordance with various aspects of the present disclosure. Process flow 700 may implement aspects of wireless communications system 100. For example, process flow 700 includes UE 115-g and base station 105-a, which may be examples of the corresponding devices described with reference to FIG. 1. Process flow 700 may illustrate the use of NOMA techniques for spreading and scrambling of a data stream for synchronous transmissions by multiple UEs 115.

At 705, base station 105-a may transmit, and UE 115-g may receive a configuration for NOMA transmissions. For example, the configuration may include a configuration of a transmission starting subframe, a repetition period for one or more repetitions of a TTI, where the repetition period may be temporally aligned with another repetition period of another UE 115, such as when transmissions from both UEs 115 begin at the same time. In some cases, the configuration may include a repetition period and a TTI bundle size for the one or more repetitions of the TTI, where the TTI spans a subframe. Additionally or alternatively, the configuration may include a configuration for an RU size, a number of RUs (e.g., N RUs), and a number of repetitions for one or more repetitions of the N RUs, where the TTI contains the N RUs. In some examples, a base station 105 may send the configuration using downlink control information signaling.

At 710, UE 115-g may generate a set of modulated symbols associated with a data stream for transmissions during a TTI. In some cases, the set of modulated data symbols may be modulated using π/2-BPSK, or may be modulated using other modulation schemes (e.g., QPSK, 16 QAM, etc.). At 715, UE 115-g may spread each symbol of the set of modulated symbols in accordance with a spreading factor. In some cases, the symbols may be spread in accordance with subframe-level spreading (e.g., where modulated symbols associated with the data stream are spread over a subframe) or may be spread in accordance with symbol level spreading (e.g., where modulated symbols associated with the data stream are spread over multiple OFDM symbols). In other cases, the spreading may occur prior to a DFT of the data stream.

At 720, UE 115-g may apply a scrambling sequence to the spread symbols. In some cases, the scrambling sequence includes a scrambling sequence with a seed generation function that is non-linear to a slot index. In some examples, applying the scrambling sequence includes applying respective portions of the scrambling sequence to respective symbols groups of the set of modulated symbols.

At 725, UE 115-g may generate a time domain waveform for the transmission of the scrambled and spread symbols. At 730, UE 115-g may transmit, and base station 105-a may receive, a transmission of the time domain waveform. The transmitted time domain waveform may include one or more repetitions of the TTI, where the transmission of the time domain waveform may be synchronized with transmissions of other UEs 115.

In some examples, UE 115-g may transmit a set of pilot signals (e.g., DMRSs) as part of the time domain waveform. In such cases, respective pilot signals of the set of pilot signals include different cyclically shifted versions of a base pilot signal based on a configured cyclic shift index. That is, the cyclic shift index may be dynamically configured and may not be fixed between different cyclic shifts. In some cases, UE 115-g may also apply a time domain orthogonal cover code to the set of pilot signals based on a resource allocation for the transmission of the time domain waveform. In some examples, UE 115-g may transmit the time domain waveform using one or more spatial layers for spatial transmit diversity.

Figure 8:
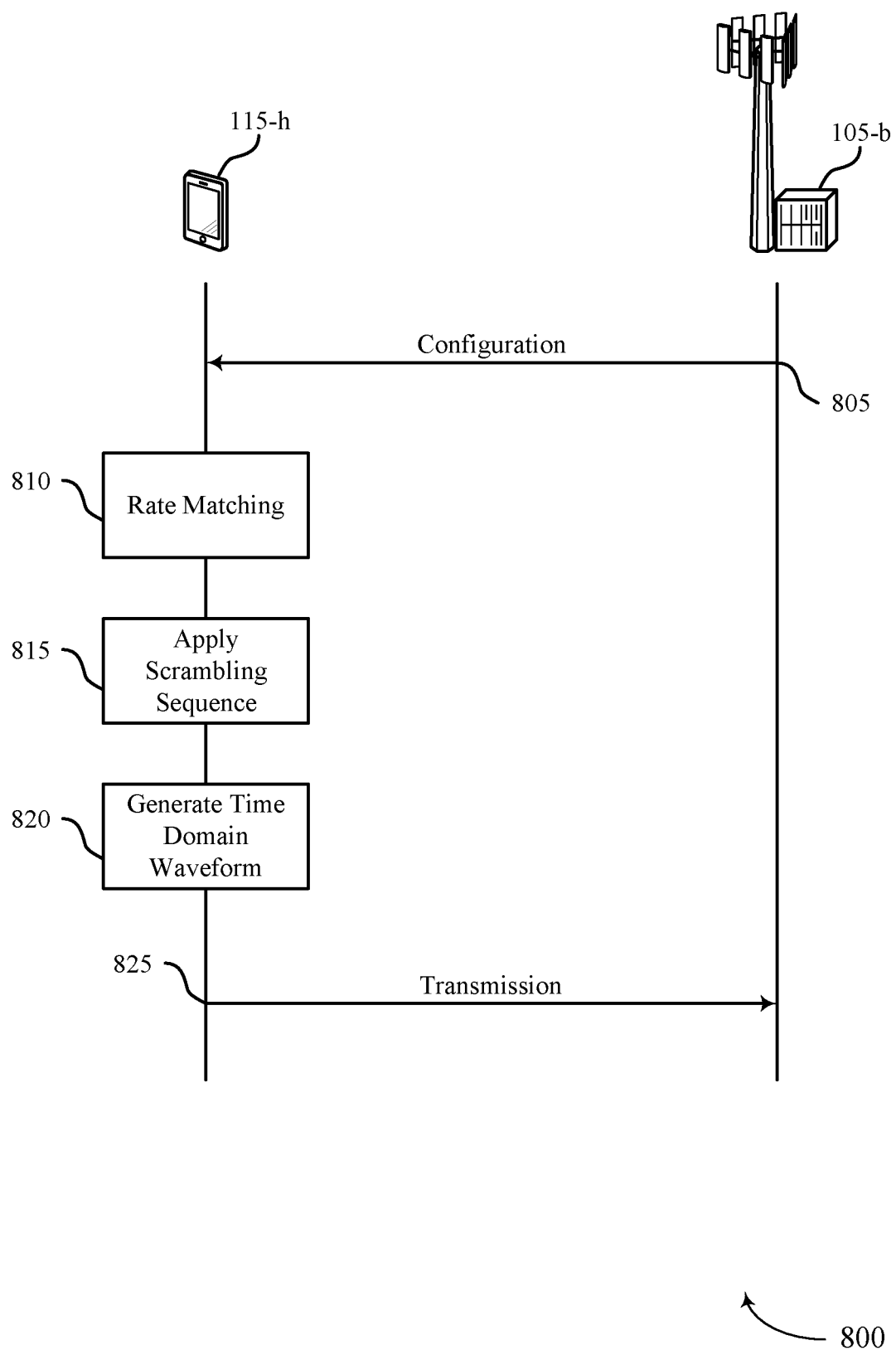

FIG. 8 illustrates an example of a process flow 800 in a system that supports NOMA techniques for NB-IoT and MTC in accordance with various aspects of the present disclosure. Process flow 800 may implement aspects of wireless communications system 100. For example, process flow 800 includes UE 115-h and base station 105-b, which may be examples of the corresponding devices described with reference to FIG. 1. Process flow 800 may illustrate the use of NOMA techniques for rate matching and scrambling of a data stream for transmissions by multiple UEs 115.

At 805, base station 105-b may transmit, and UE 115-h may receive a configuration for NOMA transmissions. For example, the configuration may include a configuration of a repetition period for one or more repetitions of a TTI, where the repetition period may be temporally aligned with another repetition period of another UE 115. In some cases, the configuration may include a repetition period and a TTI bundle size for the one or more repetitions of the TTI, where the TTI spans a subframe. Additionally or alternatively, the configuration may include a configuration for an RU size, a number of RUs (e.g., N RUs), and a number of repetitions for one or more repetitions of the N RUs, where the TTI contains the N RUs. In some examples, the configuration may be sent by base station 105-b using downlink control information signaling.

At 810, UE 115-h may perform rate matching for a set of symbols associated with a data stream for a transmission during a TTI. At 815, UE 115-h may apply a scrambling sequence to the rate-matched symbols. In some cases, the scrambling sequence includes a seed generation function that is non-linear to a slot index. In some examples, applying the scrambling sequence includes applying respective portions of the scrambling sequence to respective symbols groups of the set of modulated symbols.

At 820, UE 115-h may generate a time domain waveform for the transmission of the scrambled and rate-matched symbols. At 825, UE 115-h may transmit the time domain waveform to a receiver, where the transmitted time domain waveform contains one or more repetitions of the TTI. The transmitted time domain waveform may include one or more repetitions of the TTI, where the transmission of the time domain waveform may, in some cases, be misaligned (or loosely aligned) with transmissions of other UEs 115.

In some examples, UE 115-h may transmit a set of pilot signals (e.g., DMRSs) as part of the time domain waveform. In such cases, respective pilot signals of the set of pilot signals include different cyclically shifted versions of a base pilot signal based on a configured cyclic shift index. That is, the cyclic shift index may be dynamically configured and may not be fixed between different cyclic shifts. In some cases, UE 115-h may also apply a time domain orthogonal cover code to the set of pilot signals based on a resource allocation for the transmission of the time domain waveform. In some examples, UE 115-h may transmit the time domain waveform using one or more spatial layers for spatial transmit diversity.

In cases where the transmissions of UE 115-h are asynchronous with transmissions of the other UEs 115, UE 115-h may identify one or more time frequency resources for transmitting the time domain waveform without receiving a resource grant for the time frequency resources. For instance, UE 115-*h* may randomly select the time frequency resources without receiving a grant from base station 105-*b*. In such cases, UE 115-*h* may not perform initial access procedures to obtain a timing advance command from base station 105-*b*. In some cases, the time domain waveform may include a preamble portion and a data portion.

Figure 9:
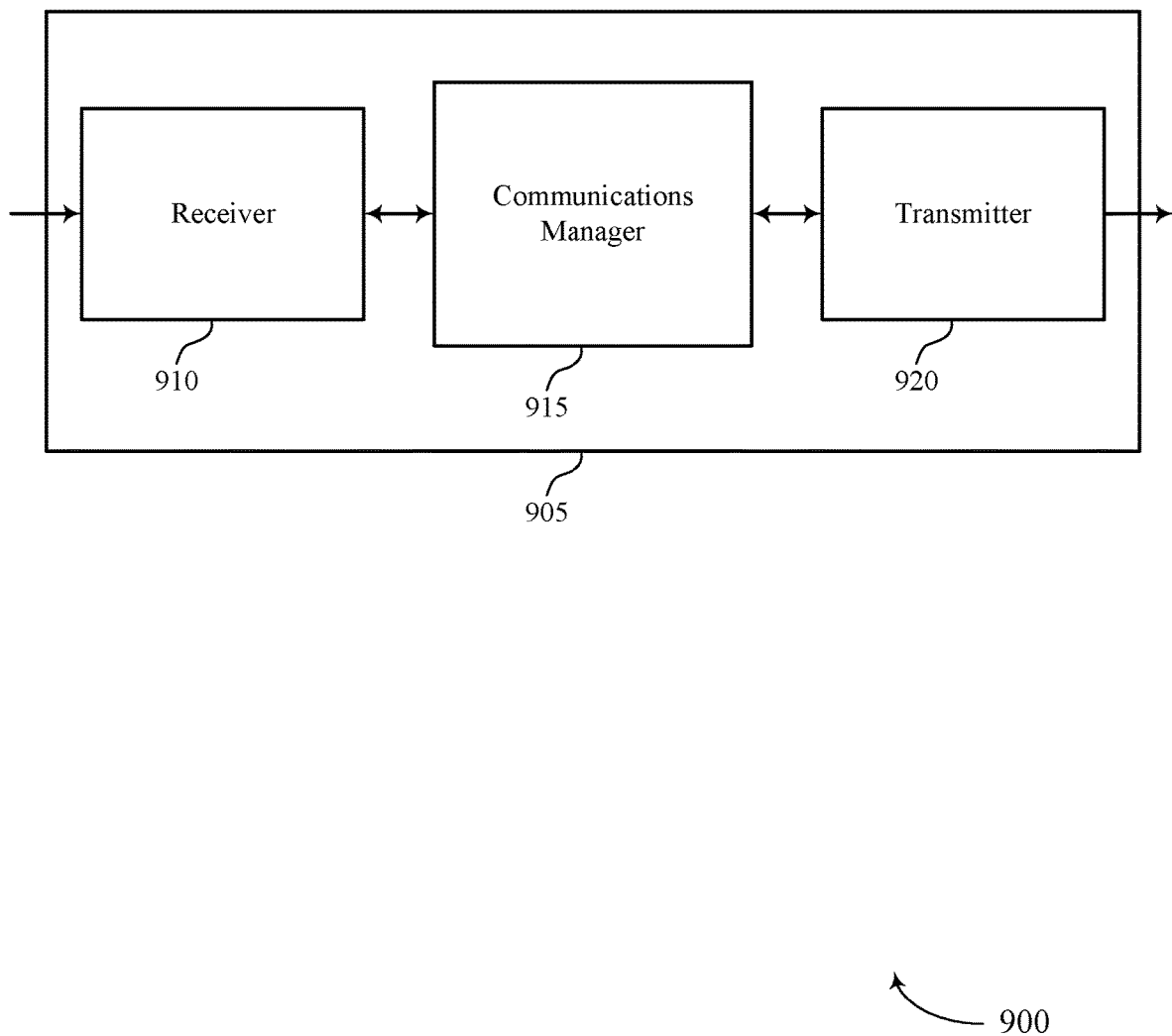
FIGS. 9 through 11 show block diagrams of a device that supports NOMA techniques for NB-IoT and MTC in accordance with aspects of the present disclosure.

FIG. 9 shows a block diagram 900 of a wireless device 905 that supports NOMA techniques for NB-IoT and MTC in accordance with aspects of the present disclosure. Wireless device 905 may be an example of aspects of a UE 115 as described herein. Wireless device 905 may include receiver 910, communications manager 915, and transmitter 920. Wireless device 905 may also include one or more processors, memory coupled with the one or more processors, and instructions stored in the memory that are executable by the one or more processors to enable the one or more processors to perform the NOMA techniques discussed herein. Each of these components may be in communication with one another (e.g., via one or more buses).

Receiver 910 may receive information such as packets, user data, or control information associated with various information channels (e.g., control channels, data channels, and information related to NOMA techniques for NB-IoT and MTC, etc.). Information may be passed on to other components of the device. The receiver 910 may be an example of aspects of the transceiver 1235 described with reference to FIG. 12. The receiver 910 may utilize a single antenna or a set of antennas.

Communications manager 915 may be an example of aspects of the communications manager 1215 described with reference to FIG. 12. Communications manager 915 and/or at least some of its various sub-components may be implemented in hardware, software executed by a processor, firmware, or any combination thereof. If implemented in software executed by a processor, the functions of the communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 915 and/or at least some of its various sub-components may be physically located at various positions, including being distributed such that portions of functions are implemented at different physical locations by one or more physical devices. In some examples, communications manager 915 and/or at least some of its various sub-components may be a separate and distinct component in accordance with various aspects of the present disclosure. In other examples, communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 915 may generate a set of modulated symbols associated with a data stream for a transmission during a TTI, spread each symbol of the set of modulated symbols in accordance with a spreading factor, and apply a scrambling sequence to the spread symbols. In some cases, communications manager 915 may generate a time domain waveform for the transmission of the scrambled and spread symbols, and transmit the time domain waveform to a receiver, the transmitted time domain waveform including one or more repetitions of the TTI, where the transmission of the time domain waveform is synchronized with transmissions of other UEs.

In other examples, communications manager 915 may also perform rate matching for a set of symbols associated with a data stream for a transmission during a TTI, apply a scrambling sequence to the rate-matched symbols, and generate a time domain waveform for the transmission of the scrambled and rate-matched symbols. In such cases, communications manager 915 may transmit the time domain waveform to a receiver, where the transmitted time domain waveform includes one or more repetitions of the TTI.

Additionally or alternatively, communications manager 915 may apply a scrambling sequence with a seed generation function non-linear to a slot index to a set of symbols associated with a data stream, identify a set of pilot signals associated with the data stream, generate a time domain waveform for a transmission of the scrambled symbols during a TTI, and transmit the time domain waveform to a receiver, where the transmitted time domain waveform includes one or more repetitions of the TTI and the set of pilot signals.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
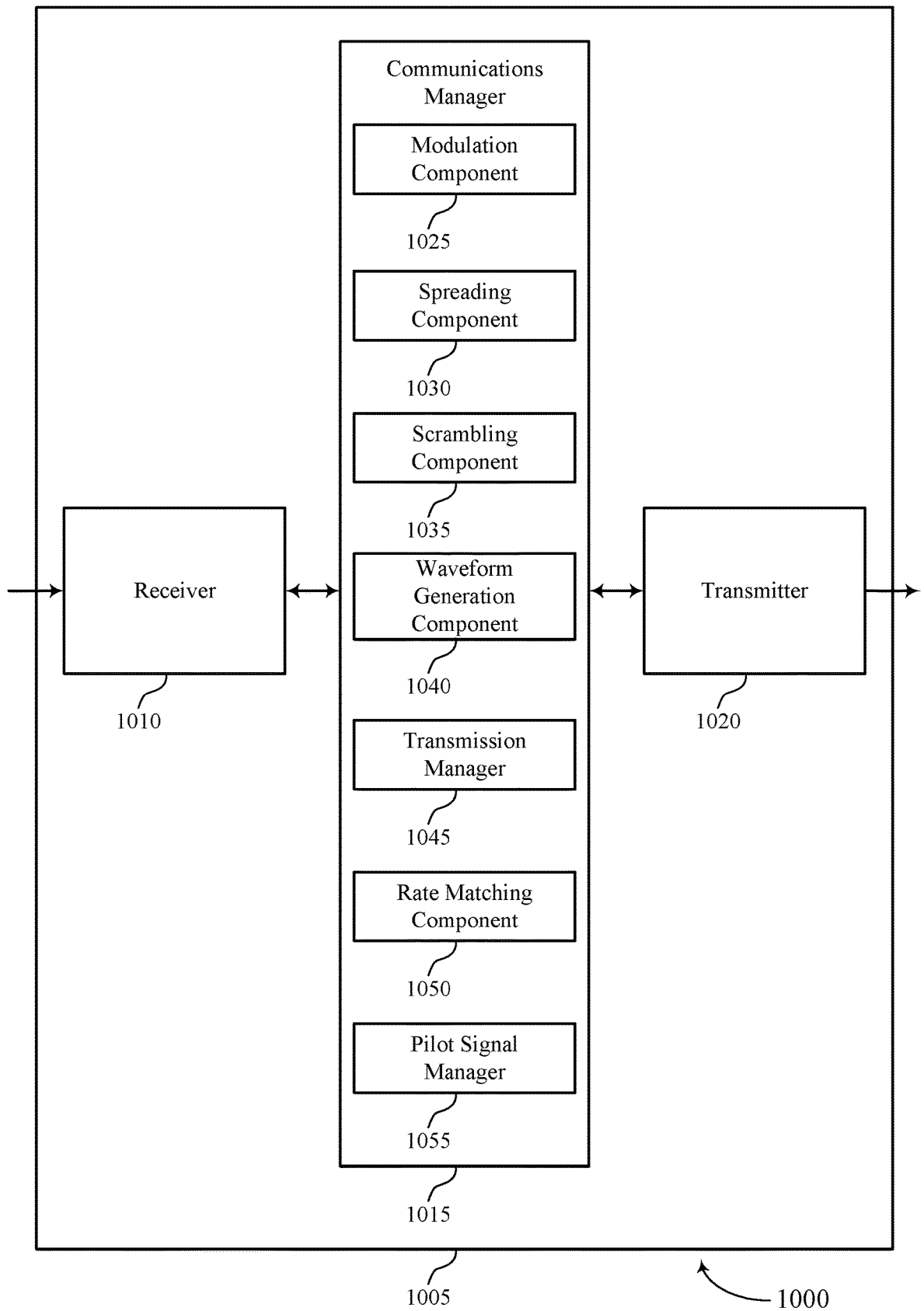

FIG. 10 shows a block diagram 1000 of a wireless device 1005 that supports NOMA techniques for NB-IoT and MTC in accordance with aspects of the present disclosure. Wireless device 1005 may be an example of aspects of a wireless device 905 or a UE 115 as described with reference to FIG. 9. Wireless device 1005 may include receiver 1010, communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to NOMA techniques for NB-IoT and MTC, etc.). Information may be passed on to other components of the device. The receiver 1010 may be an example of aspects of the transceiver 1235 described with reference to FIG. 12. The receiver 1010 may utilize a single antenna or a set of antennas. A receiver processor may be collocated with and/or communicate with (e.g., direct the operations of) the receiver 1010 of the wireless device 1005.

Communications manager 1015 may be an example of aspects of the communications manager 1215 described with reference to FIG. 12. Communications manager 1015 may also include modulation component 1025, spreading component 1030, scrambling component 1035, waveform generation component 1040, transmission manager 1045, rate matching component 1050, and pilot signal manager 1055.

Modulation component 1025 may generate a set of modulated symbols associated with a data stream for a transmission during a TTI and modulate the data stream using $\pi/2$-BPSK. In some cases, the modulation component 1025 may be a processor (e.g., a modulation processor). The processor may be coupled with memory and execute instructions stored in the memory that enable the processor to perform or facilitate the modulation features discussed herein.

Spreading component 1030 may spread each symbol of the set of modulated symbols in accordance with a spreading factor. In some cases, spreading component 1030 may spread each symbol of the set of modulated symbols prior to generating a frequency domain waveform (e.g., using a DFT), where the time domain waveform is generated based on the frequency domain waveform. In some cases, spreading component 1030 may be a processor. The processor may be coupled with memory and execute instructions stored in the memory that enable the processor to perform or facilitate the symbol spreading features discussed herein.

Scrambling component 1035 may apply a scrambling sequence to the spread symbols. Additionally or alternatively, scrambling component 1035 may apply the scrambling sequence to the rate-matched symbols. In some examples, scrambling component 1035 may apply a scrambling sequence with a seed generation function non-linear to a slot index to a set of symbols associated with a data stream. In some cases, applying the scrambling sequence to the spread symbols includes applying respective portions of the scrambling sequence to respective symbols groups of the set of modulated symbols. Similarly, applying the scrambling sequence to the rate-matched symbols includes applying the respective portions of the scrambling sequence to respective symbols groups of the set of modulated symbols. In some examples, scrambling component 1035 may be a processor. The processor may be coupled with memory and execute instructions stored in the memory that enable the processor to perform or facilitate the scrambling features discussed herein.

Waveform generation component 1040 may generate a time domain waveform for the transmission of the scrambled and spread symbols. In other examples, waveform generation component 1040 may generate a time domain waveform for the transmission of the scrambled and rate-matched symbols. In other examples, waveform generation component 1040 may generate a time domain waveform for a transmission of the scrambled symbols during a TTI. In some examples, waveform generation component 1040 may be a processor (e.g., a transceiver processor or a radio processor). The processor may be coupled with memory and execute instructions stored in the memory that enable the processor to perform or facilitate the waveform generation features discussed herein. A transceiver processor may be collocated with and/or communicate with (e.g., direct the operations of) a transceiver of the device. A radio processor may be collocated with and/or communicate with (e.g., direct the operations of) a radio (e.g., an LTE radio, a Wi-Fi radio, an NR radio, etc.) of the wireless device 1005.

Transmission manager 1045 may transmit the time domain waveform to a receiver, the transmitted time domain waveform including one or more repetitions of the TTI, where the transmission of the time domain waveform is synchronized with transmissions of other UEs. In some examples, transmission manager 1045 may transmit the time domain waveform using one or more spatial layers. In some cases, transmission manager 1045 may determine a number of TTIs per transport block for transmitting the one or more repetitions of the TTI, where the number of TTIs per transport block may be used for a coarse alignment of the transmitted time domain waveform. In some cases, transmission manager 1045 may be a processor (e.g., a transceiver processor or a radio processor). The processor may be coupled with memory and execute instructions stored in the memory that enable the processor to perform or facilitate the waveform transmission features discussed herein.

In some cases, transmission manager 1045 may transmit the time domain waveform to a receiver, where the transmitted time domain waveform includes one or more repetitions of the TTI. In other examples, the transmitted time domain waveform includes one or more repetitions of the TTI and the set of pilot signals. In some cases, the TTI includes one of a subframe or an OFDM symbol period. Rate matching component 1050 may perform rate matching for a set of symbols associated with a data stream for a transmission during a TTI. In some examples, rate matching component 1050 may be a processor. The processor may be coupled with memory and execute instructions stored in the memory that enable the processor to perform or facilitate the rate matching features discussed herein.

Pilot signal manager 1055 may transmit a set of pilot signals as part of the time domain waveform, where respective pilot signals of the set of pilot signals include different cyclically shifted versions of a base pilot signal based on a configured cyclic shift index. In some cases, pilot signal manager 1055 may apply a time domain orthogonal cover code to the set of pilot signals based on a resource allocation for the transmission of the time domain waveform. In some cases, pilot signal manager 1055 may identify a set of pilot signals associated with the data stream, and respective pilot signals of the set of pilot signals include different cyclically shifted versions of a base pilot signal based on a cyclic shift index. In some cases, the set of pilot signals includes DMRSs. In some cases, pilot signal manager 1055 may be a processor. The processor may be coupled with memory and execute instructions stored in the memory that enable the processor to perform or facilitate the rate matching features discussed herein.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas. A transceiver processor may be collocated with and/or communicate with (e.g., direct the operations of) the transmitter 1020 of the wireless device 1005.

Figure 11:
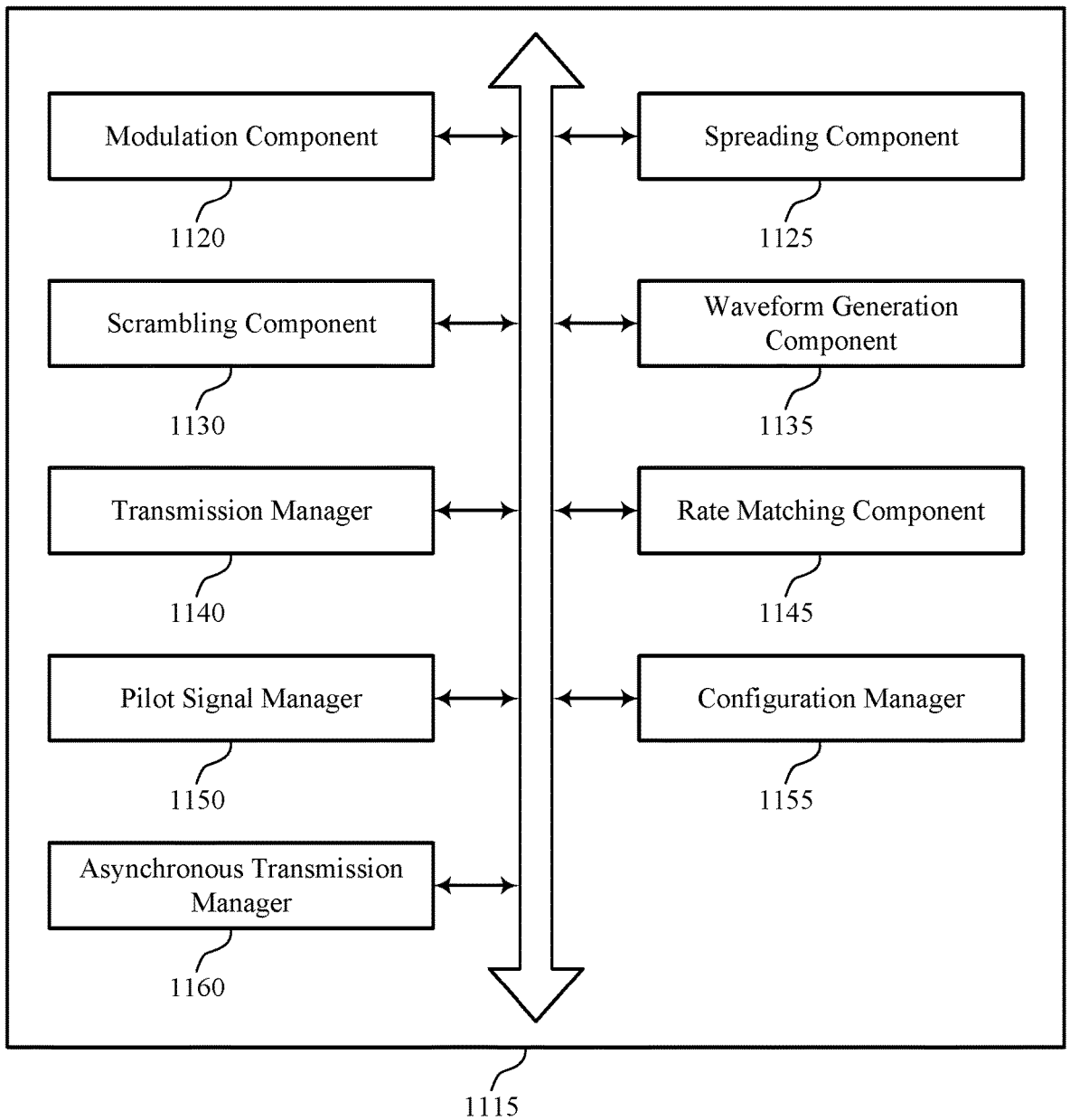

FIG. 11 shows a block diagram 1100 of a communications manager 1115 that supports NOMA techniques for NB-IoT and MTC in accordance with aspects of the present disclosure. The communications manager 1115 may be an example of aspects of a communications manager 915, a communications manager 1015, or a communications manager 1215 described with reference to FIGS. 9, 10, and 12. The communications manager 1115 may include modulation component 1120, spreading component 1125, scrambling component 1130, waveform generation component 1135, transmission manager 1140, rate matching component 1145, pilot signal manager 1150, configuration manager 1155, and asynchronous transmission manager 1160. Each of these modules may communicate, directly or indirectly, with one another (e.g., via one or more buses).

Modulation component 1120 may generate a set of modulated symbols associated with a data stream for a transmission during a TTI and modulate the data stream using $\pi/2$-BPSK. In some cases, the modulation component 1120 may be a processor (e.g., a modulation processor). The processor may be coupled with memory and execute instructions stored in the memory that enable the processor to perform or facilitate the modulation features discussed herein.

Spreading component 1125 may spread each symbol of the set of modulated symbols in accordance with a spreading factor. In some cases, spreading component 1125 may spread each symbol of the set of modulated symbols prior to generating a frequency domain waveform (e.g., using a DFT), where the time domain waveform is generated based on the frequency domain waveform. In some examples, spreading component 1125 may be a processor. The processor may be coupled with memory and execute instructions stored in the memory that enable the processor to perform or facilitate the symbol spreading features discussed herein.

Scrambling component 1130 may apply a scrambling sequence to the spread symbols. Additionally or alternatively, scrambling component 1130 may apply the scrambling sequence to the rate-matched symbols. In some examples, scrambling component 1130 may apply a scrambling sequence with a seed generation function non-linear to a slot index to a set of symbols associated with a data stream. In some cases, applying the scrambling sequence to the spread symbols includes applying respective portions of the scrambling sequence to respective symbols groups of the set of modulated symbols. Similarly, applying the scrambling sequence to the rate-matched symbols includes applying the respective portions of the scrambling sequence to respective symbols groups of the set of modulated symbols. In some cases, scrambling component 1130 may be a processor. The processor may be coupled with memory and execute instructions stored in the memory that enable the processor to perform or facilitate the symbol spreading features discussed herein.

Waveform generation component 1135 may generate a time domain waveform for the transmission of the scrambled and spread symbols. In other examples, waveform generation component 1135 may generate a time domain waveform for the transmission of the scrambled and rate-matched symbols. In other examples, waveform generation component 1135 may generate a time domain waveform for a transmission of the scrambled symbols during a TTI. In some examples, waveform generation component 1135 may be a processor (e.g., a transceiver processor or a radio processor). The processor may be coupled with memory and execute instructions stored in the memory that enable the processor to perform or facilitate the waveform generation features discussed herein. A transceiver processor may be collocated with and/or communicate with (e.g., direct the operations of) a transceiver of the device. A radio processor may be collocated with and/or communicate with (e.g., direct the operations of) a radio (e.g., an LTE radio, a Wi-Fi radio, an NR radio, etc.) of the wireless device.

Transmission manager 1140 may transmit the time domain waveform to a receiver, the transmitted time domain waveform including one or more repetitions of the TTI, where the transmission of the time domain waveform is synchronized with transmissions of other UEs. In some examples, transmission manager 1140 may transmit the time domain waveform using one or more spatial layers. In some cases, transmission manager 1140 may determine a number of TTIs per transport block for transmitting the one or more repetitions of the TTI, where the number of TTIs per transport block may be used for a coarse alignment of the transmitted time domain waveform. In some cases, transmission manager 1140 may be a processor (e.g., a transceiver processor or a radio processor). The processor may be coupled with memory and execute instructions stored in the memory that enable the processor to perform or facilitate the waveform transmission features discussed herein.

In some cases, transmission manager 1140 may transmit the time domain waveform to a receiver, where the transmitted time domain waveform includes one or more repetitions of the TTI. In other examples, the transmitted time domain waveform includes one or more repetitions of the TTI and the set of pilot signals. In some cases, the TTI includes one of a subframe or an OFDM symbol period. Rate matching component 1145 may perform rate matching for a set of symbols associated with a data stream for a transmission during a TTI.

Rate matching component 1145 may perform rate matching for a set of symbols associated with a data stream for a transmission during a TTI. In some examples, rate matching component 1145 may be a processor. The processor may be coupled with memory and execute instructions stored in the memory that enable the processor to perform or facilitate the rate matching features discussed herein.

Pilot signal manager 1150 may transmit a set of pilot signals as part of the time domain waveform, where respective pilot signals of the set of pilot signals include different cyclically shifted versions of a base pilot signal based on a configured cyclic shift index. In some cases, pilot signal manager 1150 may apply a time domain orthogonal cover code to the set of pilot signals based on a resource allocation for the transmission of the time domain waveform. In some cases, pilot signal manager 1150 may identify a set of pilot signals associated with the data stream, and respective pilot signals of the set of pilot signals include different cyclically shifted versions of a base pilot signal based on a cyclic shift index. In some cases, the set of pilot signals includes DMRSs. In some cases, pilot signal manager 1150 may be a processor. The processor may be coupled with memory and execute instructions stored in the memory that enable the processor to perform or facilitate the rate matching features discussed herein.

Configuration manager 1155 may identify a configuration for a repetition period for the one or more repetitions of the TTI, where the repetition period is temporally aligned with another repetition period of another UE. In some cases, configuration manager 1155 may identify a configuration for a repetition period and a TTI bundle size for the one or more repetitions of the TTI, where the TTI includes a subframe. In some examples, configuration manager 1155 may identify a configuration for an RU size, a number of RUs, and a number of repetitions for one or more repetitions of an RU, where the TTI includes the number of RUs. In some cases, configuration manager 1155 may identify a configuration for a repetition period for the one or more repetitions of the TTI, where the repetition period is temporally misaligned with another repetition period of another UE, and identify a configuration of a repetition period and a TTI bundle size for the one or more repetitions of the TTI, where the TTI includes a subframe. In some cases, configuration manager 1155 may be a processor. The processor may be coupled with memory and execute instructions stored in the memory that enable the processor to perform or facilitate the configuration identification features discussed herein.

Asynchronous transmission manager 1160 may identify one or more time frequency resources for transmitting the time domain waveform without receiving a resource grant for the one or more time frequency resources and transmit the time domain waveform on the one or more time frequency resources. In some cases, asynchronous transmission manager 1160 may refrain from performing an initial access procure for transmitting on the one or more time frequency resources, where the one or more time frequency resources are identified in an absence of timing advance information from a base station. In some cases, the time domain waveform includes a preamble portion and a data portion. In some examples, asynchronous transmission manager 1160 may transmit one or more DMRSs in the data portion of the time domain waveform. In some cases, asynchronous transmission manager 1160 may be a processor (a transceiver processor, or a radio processor, or a receiver processor). The processor may be coupled with memory and execute instructions stored in the memory that enable the processor to perform or facilitate the resource identification, initial access, and reference signal transmission features discussed herein.

Figure 12:
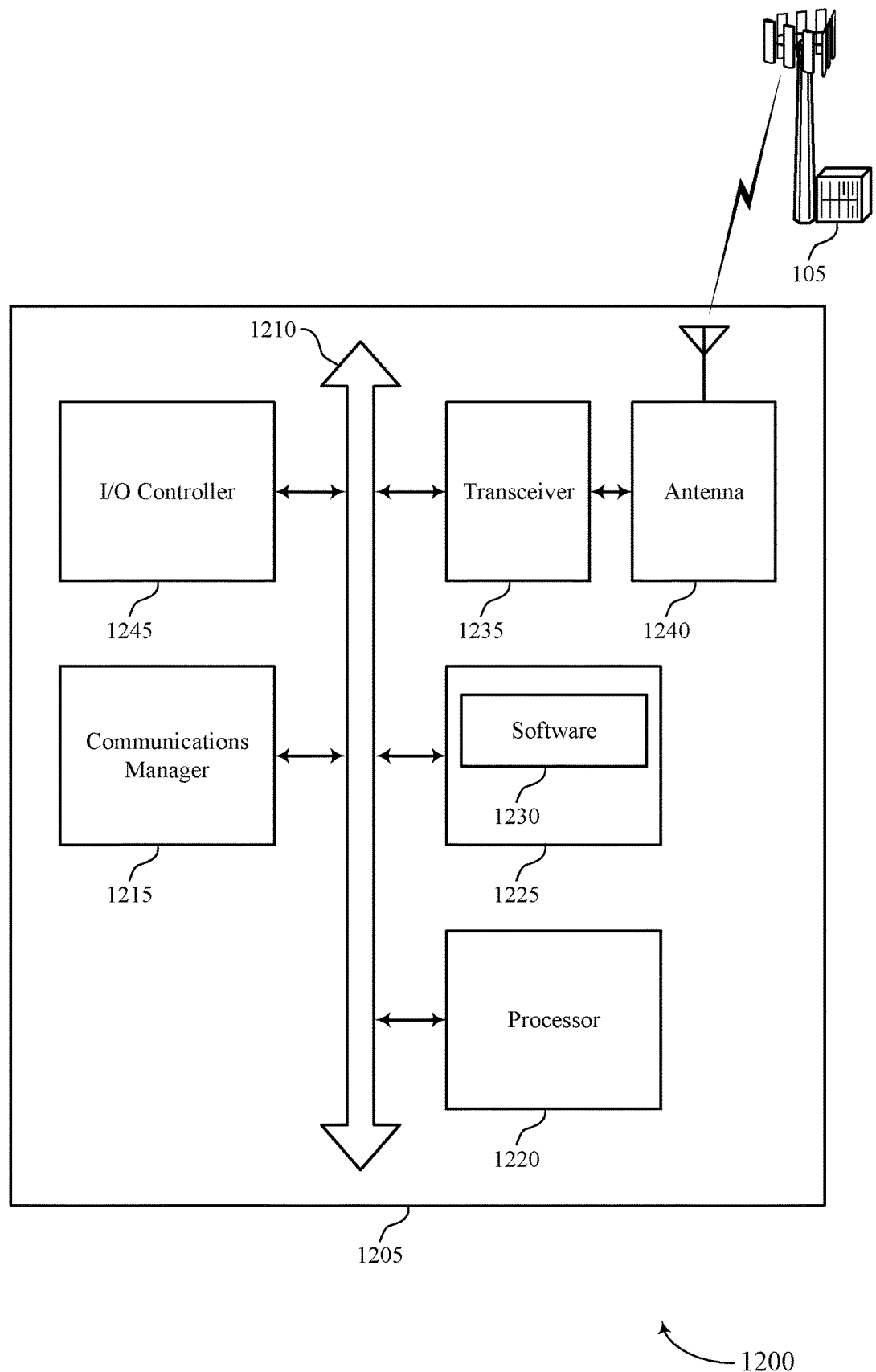
FIG. 12 illustrates a block diagram of a system including a UE that supports NOMA techniques for NB-IoT and MTC in accordance with aspects of the present disclosure.

FIG. 12 shows a diagram of a system 1200 including a device 1205 that supports NOMA techniques for NB-IoT and MTC in accordance with aspects of the present disclosure. Device 1205 may be an example of or include the components of wireless device 905, wireless device 1005, or a UE 115 as described above, e.g., with reference to FIGS. 9 and 10. Device 1205 may include components for bi-directional voice and data communications including components for transmitting and receiving communications, including communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting NOMA techniques for NB-IoT and MTC).

Memory 1225 may include random-access memory (RAM) and read-only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

Software 1230 may include code to implement aspects of the present disclosure, including code to support NOMA techniques for NB-IoT and MTC. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described herein. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
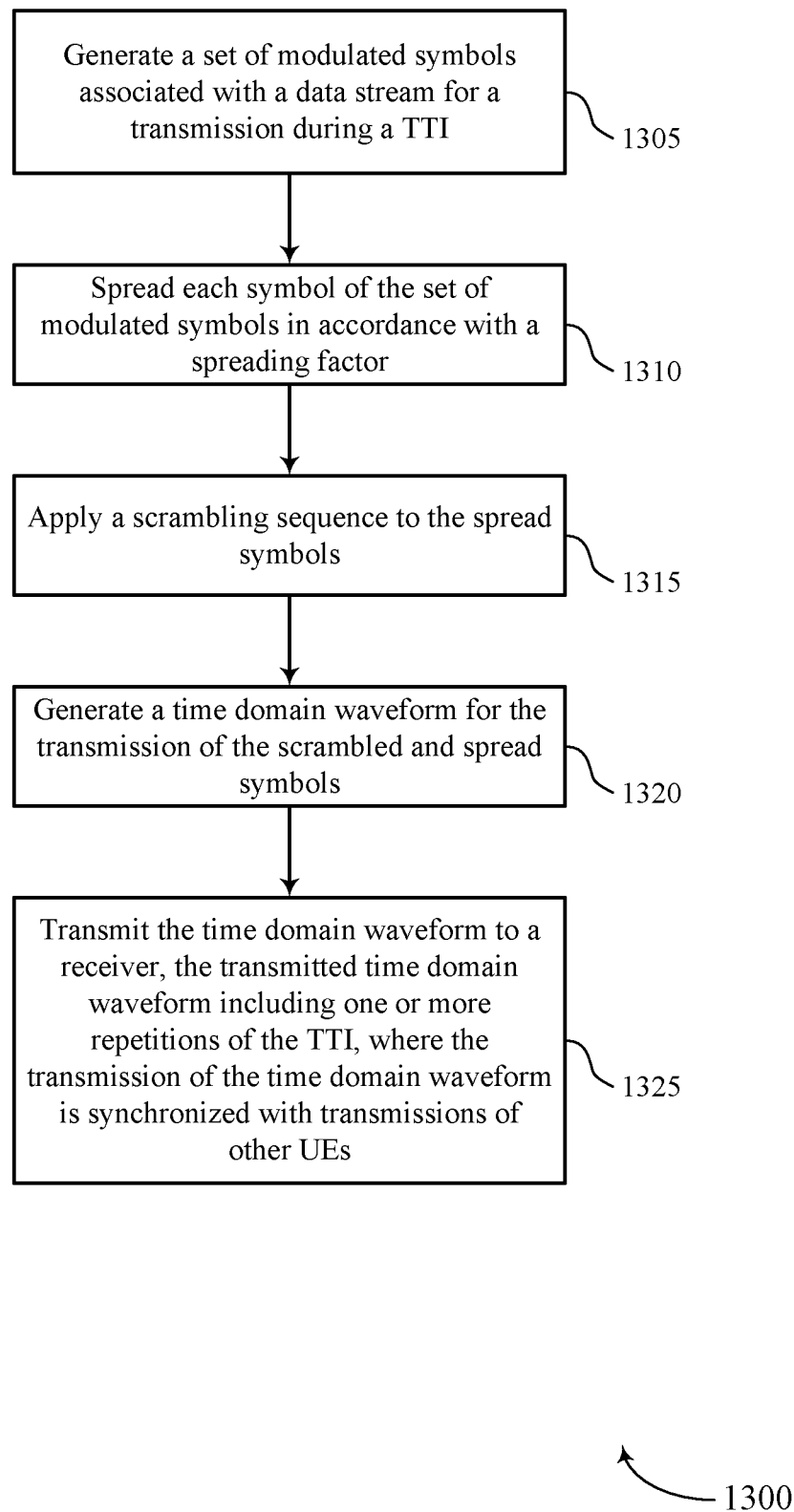
FIGS. 13 through 18 illustrate methods for NOMA techniques for NB-IoT and MTC in accordance with aspects of the present disclosure.

FIG. 13 shows a flowchart illustrating a method 1300 for NOMA techniques for NB-IoT and MTC in accordance with aspects of the present disclosure. The operations of method 1300 may be implemented by a UE 115 or its components as described herein. For example, the operations of method 1300 may be performed by a communications manager as described with reference to FIGS. 9 through 12. In some examples, a UE 115 may execute a set of codes to control the functional elements of the device to perform the functions described herein. Additionally, or alternatively, the UE 115 may perform aspects of the functions described herein using special-purpose hardware.

At 1305 the UE 115 may generate a set of modulated symbols associated with a data stream for a transmission during a TTI. The operations of 1305 may be performed according to the methods described herein. In some examples, aspects of the operations of 1305 may be performed by a modulation component as described with reference to FIGS. 9 through 12.

At 1310 the UE 115 may spread each symbol of the set of modulated symbols in accordance with a spreading factor. The operations of 1310 may be performed according to the methods described herein. In some examples, aspects of the operations of 1310 may be performed by a spreading component as described with reference to FIGS. 9 through 12.

At 1315 the UE 115 may apply a scrambling sequence to the spread symbols. The operations of 1315 may be performed according to the methods described herein. In some examples, aspects of the operations of 1315 may be performed by a scrambling component as described with reference to FIGS. 9 through 12.

At 1320 the UE 115 may generate a time domain waveform for the transmission of the scrambled and spread symbols. The operations of 1320 may be performed according to the methods described herein. In some examples, aspects of the operations of 1320 may be performed by a waveform generation component as described with reference to FIGS. 9 through 12.

At 1325 the UE 115 may transmit the time domain waveform to a receiver, the transmitted time domain waveform containing one or more repetitions of the TTI, where the transmission of the time domain waveform is synchronized with transmissions of other UEs 115. The operations of 1325 may be performed according to the methods described herein. In some examples, aspects of the operations of 1325 may be performed by a transmission manager as described with reference to FIGS. 9 through 12.

Figure 14:
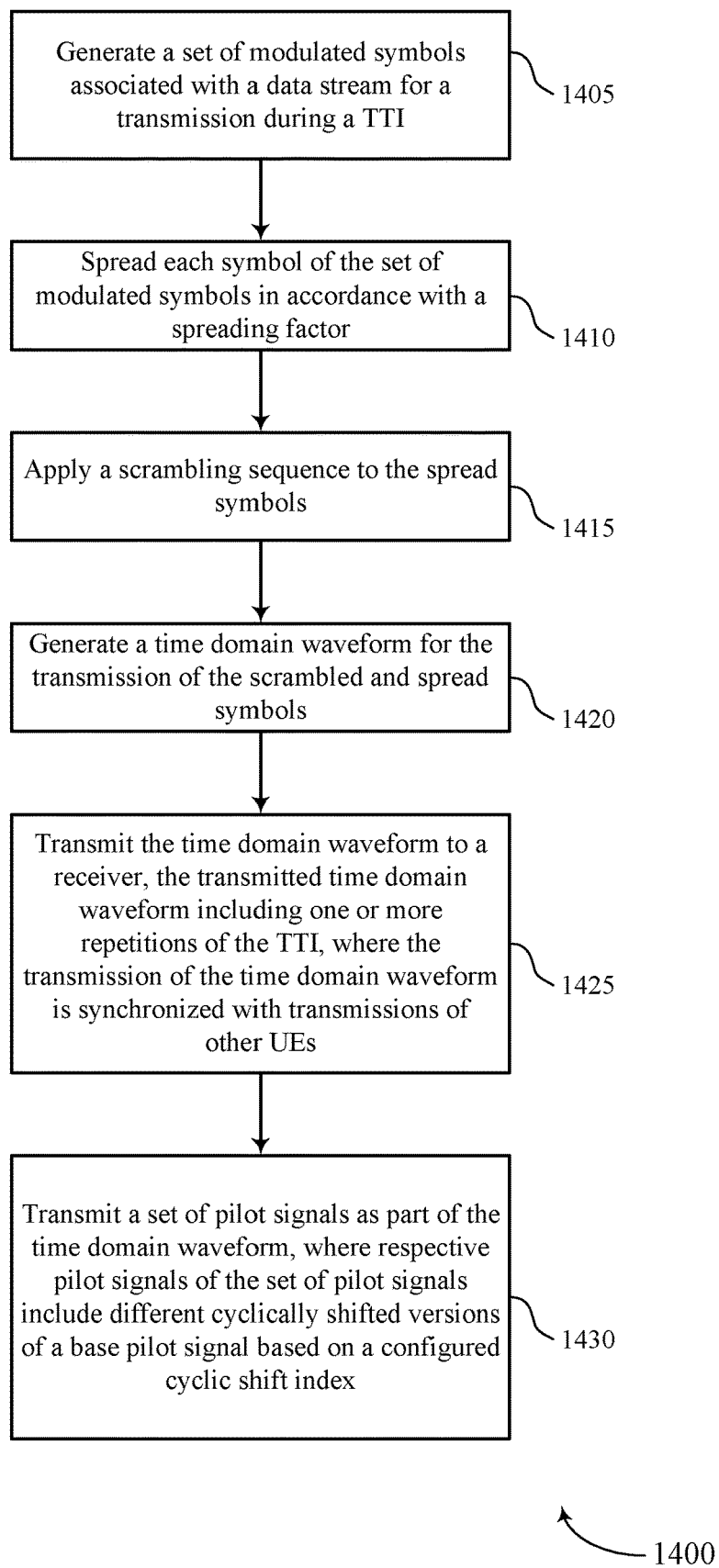

FIG. 14 shows a flowchart illustrating a method 1400 for NOMA techniques for NB-IoT and MTC in accordance with aspects of the present disclosure. The operations of method 1400 may be implemented by a UE 115 or its components as described herein. For example, the operations of method 1400 may be performed by a communications manager as described with reference to FIGS. 9 through 12. In some examples, a UE 115 may execute a set of codes to control the functional elements of the device to perform the functions described herein. Additionally, or alternatively, the UE 115 may perform aspects of the functions described herein using special-purpose hardware.

At 1405 the UE 115 may generate a set of modulated symbols associated with a data stream for a transmission during a transmission time interval (TTI). The operations of 1405 may be performed according to the methods described herein. In some examples, aspects of the operations of 1405 may be performed by a modulation component as described with reference to FIGS. 9 through 12.

At 1410 the UE 115 may spread each symbol of the set of modulated symbols in accordance with a spreading factor. The operations of 1410 may be performed according to the methods described herein. In some examples, aspects of the operations of 1410 may be performed by a spreading component as described with reference to FIGS. 9 through 12.

At 1415 the UE 115 may apply a scrambling sequence to the spread symbols. The operations of 1415 may be performed according to the methods described herein. In some examples, aspects of the operations of 1415 may be performed by a scrambling component as described with reference to FIGS. 9 through 12.

At 1420 the UE 115 may generate a time domain waveform for the transmission of the scrambled and spread symbols. The operations of 1420 may be performed according to the methods described herein. In some examples, aspects of the operations of 1420 may be performed by a waveform generation component as described with reference to FIGS. 9 through 12.

At 1425 the UE 115 may transmit the time domain waveform to a receiver, the transmitted time domain waveform comprising one or more repetitions of the TTI, where the transmission of the time domain waveform is synchronized with transmissions of other UEs 115. The operations of 1425 may be performed according to the methods described herein. In some examples, aspects of the operations of 1425 may be performed by a transmission manager as described with reference to FIGS. 9 through 12.

At 1430 the UE 115 may transmit a set of pilot signals as part of the time domain waveform, where respective pilot signals of the set of pilot signals contain different cyclically shifted versions of a base pilot signal based on a configured cyclic shift index. The operations of 1430 may be performed according to the methods described herein. In some examples, aspects of the operations of 1430 may be performed by a pilot signal manager as described with reference to FIGS. 9 through 12.

Figure 15:
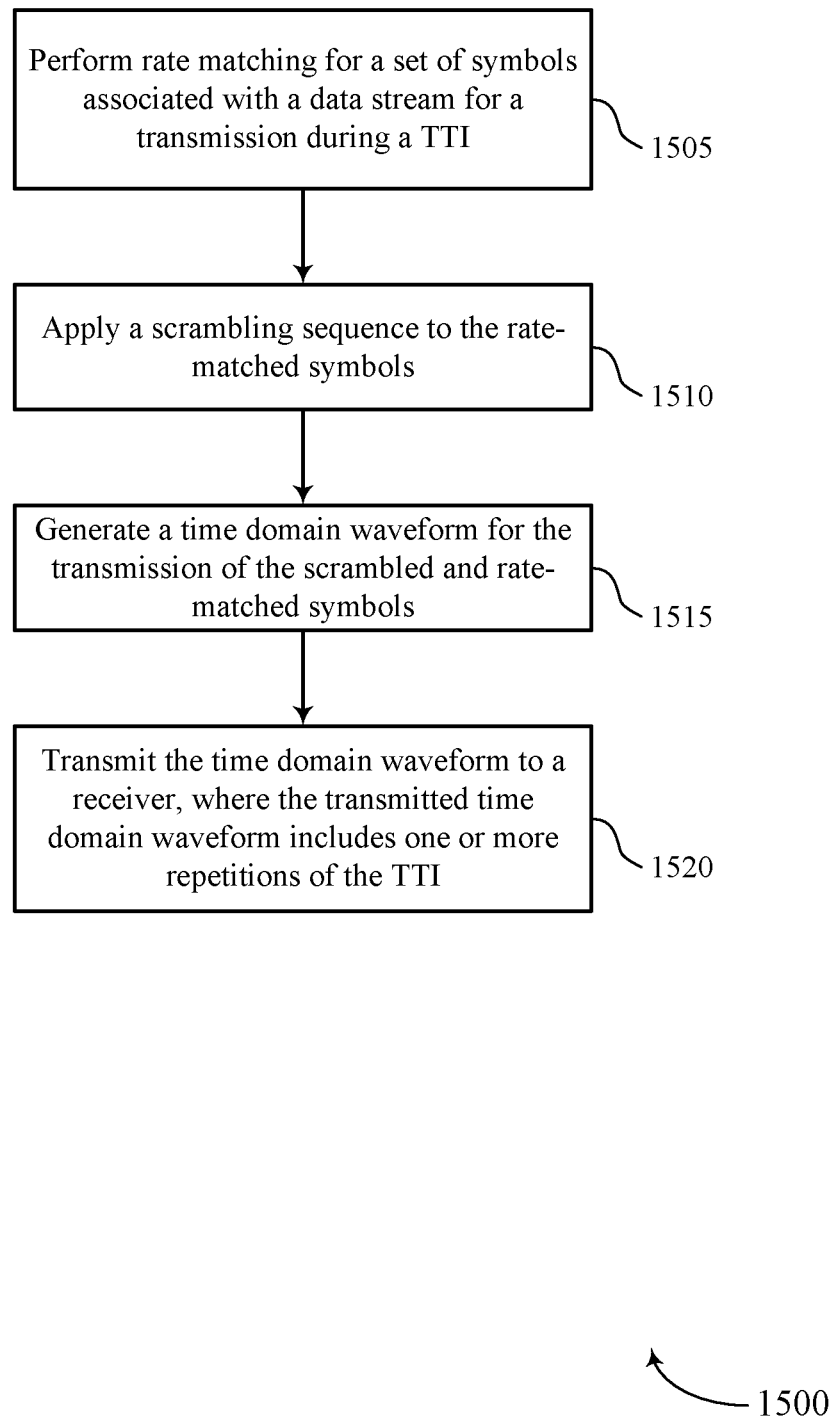

FIG. 15 shows a flowchart illustrating a method 1500 for NOMA techniques for NB-IoT and MTC in accordance with aspects of the present disclosure. The operations of method 1500 may be implemented by a UE 115 or its components as described herein. For example, the operations of method 1500 may be performed by a communications manager as described with reference to FIGS. 9 through 12. In some examples, a UE 115 may execute a set of codes to control the functional elements of the device to perform the functions described herein. Additionally, or alternatively, the UE 115 may perform aspects of the functions described herein using special-purpose hardware.

At 1505 the UE 115 may perform rate matching for a set of symbols associated with a data stream for a transmission during a transmission time interval (TTI). The operations of 1505 may be performed according to the methods described herein. In some examples, aspects of the operations of 1505 may be performed by a rate matching component as described with reference to FIGS. 9 through 12.

At 1510 the UE 115 may apply a scrambling sequence to the rate-matched symbols. In some examples, the scrambling sequence may contain a seed generation function non-linear to a slot index to the rate-matched symbols. The operations of 1510 may be performed according to the methods described herein. In some examples, aspects of the operations of 1510 may be performed by a scrambling component as described with reference to FIGS. 9 through 12.

At 1515 the UE 115 may generate a time domain waveform for the transmission of the scrambled and rate-matched symbols. In some examples, UE 115 may identify a set of pilot signals associated with a data stream and transmit the set of pilot signals as part of the time domain waveform. In such examples, the time domain waveform may contain different cyclically shifted versions of a base pilot signal which may further be based on a configured cyclic shift index. The operations of 1515 may be performed according to the methods described herein. In some examples, aspects of the operations of 1515 may be performed by a waveform generation component as described with reference to FIGS. 9 through 12.

At 1520 the UE 115 may transmit the time domain waveform to a receiver, where the transmitted time domain waveform contains one or more repetitions of the TTI. The transmitted time domain waveform may additionally or alternatively contain the set of pilot signals. The operations of 1520 may be performed according to the methods described herein. In some examples, aspects of the operations of 1520 may be performed by a transmission manager as described with reference to FIGS. 9 through 12.

Figure 16:
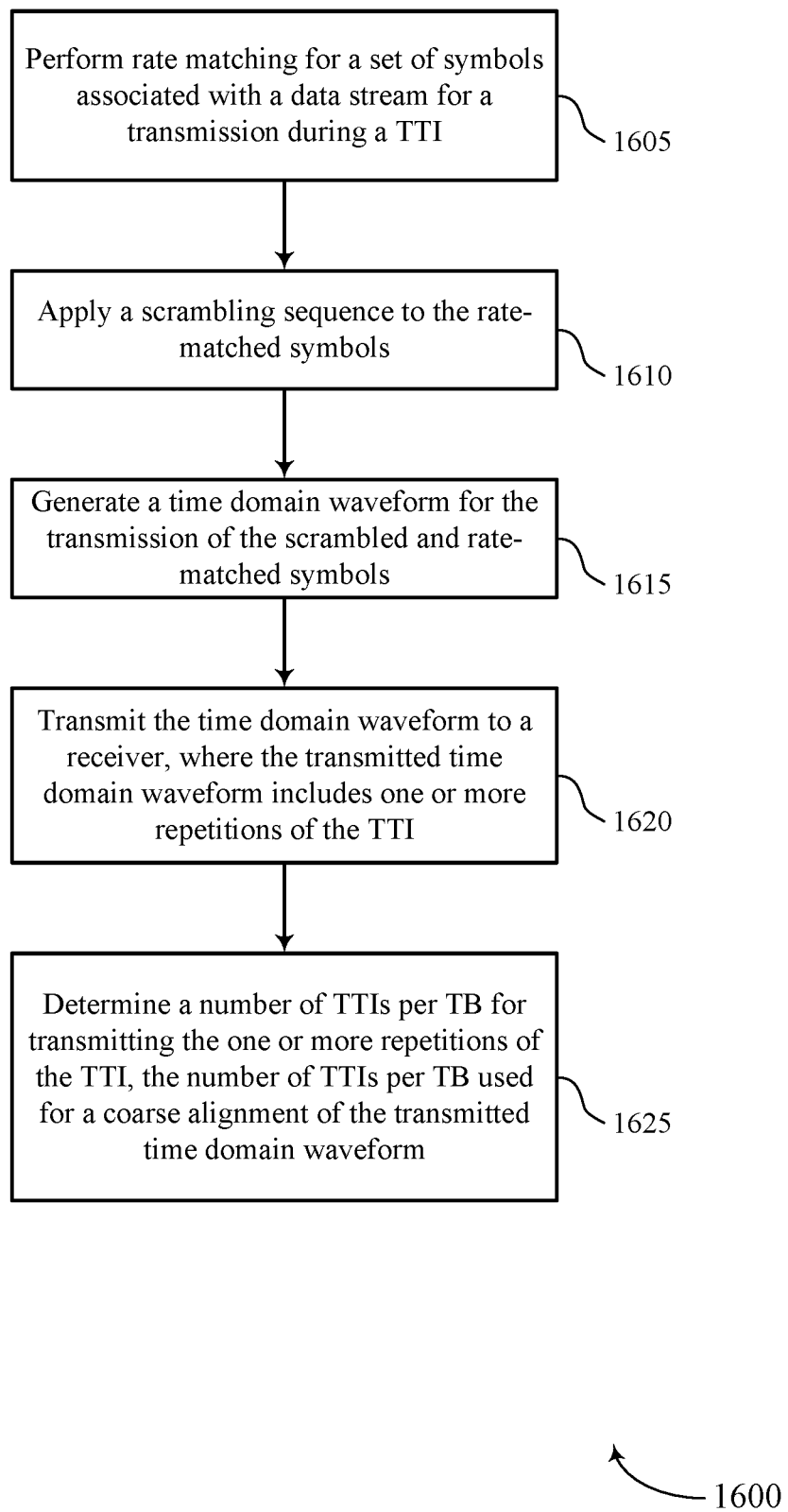

FIG. 16 shows a flowchart illustrating a method 1600 for NOMA techniques for NB-IoT and MTC in accordance with aspects of the present disclosure. The operations of method 1600 may be implemented by a UE 115 or its components as described herein. For example, the operations of method 1600 may be performed by a communications manager as described with reference to FIGS. 9 through 12. In some examples, a UE 115 may execute a set of codes to control the functional elements of the device to perform the functions described herein. Additionally, or alternatively, the UE 115 may perform aspects of the functions described herein using special-purpose hardware.

At 1605 the UE 115 may perform rate matching for a set of symbols associated with a data stream for a transmission during a transmission time interval (TTI). The operations of 1605 may be performed according to the methods described herein. In some examples, aspects of the operations of 1605 may be performed by a rate matching component as described with reference to FIGS. 9 through 12.

At 1610 the UE 115 may apply a scrambling sequence to the rate-matched symbols. The operations of 1610 may be performed according to the methods described herein. In some examples, aspects of the operations of 1610 may be performed by a scrambling component as described with reference to FIGS. 9 through 12.

At 1615 the UE 115 may generate a time domain waveform for the transmission of the scrambled and rate-matched symbols. The operations of 1615 may be performed according to the methods described herein. In some examples, aspects of the operations of 1615 may be performed by a waveform generation component as described with reference to FIGS. 9 through 12.

At 1620 the UE 115 may transmit the time domain waveform to a receiver, where the transmitted time domain waveform contains one or more repetitions of the TTI. The operations of 1620 may be performed according to the methods described herein. In some examples, aspects of the operations of 1620 may be performed by a transmission manager as described with reference to FIGS. 9 through 12.

At 1625 the UE 115 may determine a number of TTIs per transport block for transmitting the one or more repetitions of the TTI, the number of TTIs per transport block used for a coarse alignment of the transmitted time domain waveform. The operations of 1625 may be performed according to the methods described herein. In some examples, aspects of the operations of 1625 may be performed by a transmission manager as described with reference to FIGS. 9 through 12.

Figure 17:
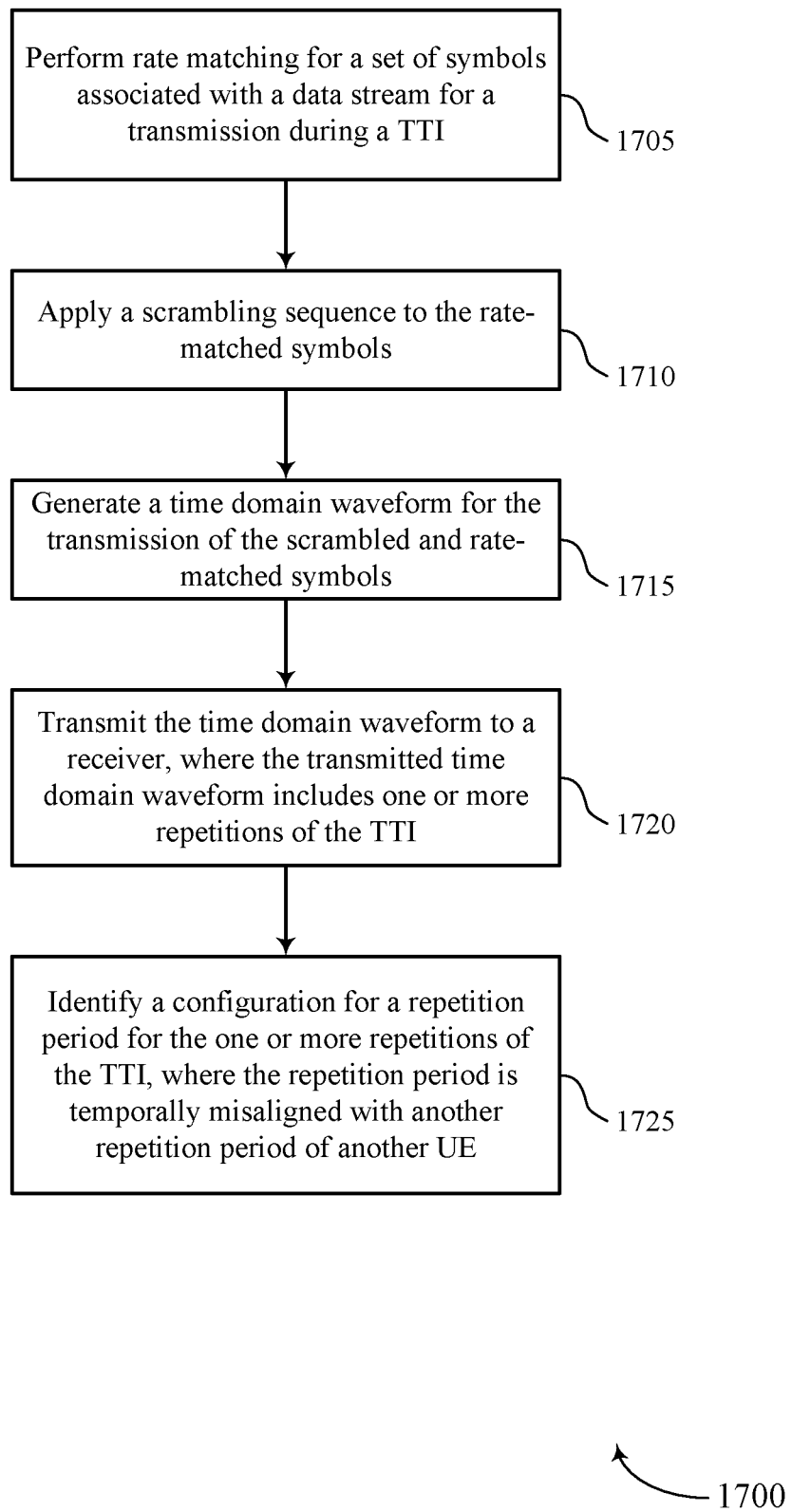

FIG. 17 shows a flowchart illustrating a method 1700 for NOMA techniques for NB-IoT and MTC in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE 115 may execute a set of codes to control the functional elements of the device to perform the functions described herein. Additionally, or alternatively, the UE 115 may perform aspects of the functions described herein using special-purpose hardware.

At 1705 the UE 115 may perform rate matching for a set of symbols associated with a data stream for a transmission during a transmission time interval (TTI). The operations of 1705 may be performed according to the methods described herein. In some examples, aspects of the operations of 1705 may be performed by a rate matching component as described with reference to FIGS. 9 through 12.

At 1710 the UE 115 may apply a scrambling sequence to the rate-matched symbols. The operations of 1710 may be performed according to the methods described herein. In some examples, aspects of the operations of 1710 may be performed by a scrambling component as described with reference to FIGS. 9 through 12.

At 1715 the UE 115 may generate a time domain waveform for the transmission of the scrambled and rate-matched symbols. The operations of 1715 may be performed according to the methods described herein. In some examples, aspects of the operations of 1715 may be performed by a waveform generation component as described with reference to FIGS. 9 through 12.

At 1720 the UE 115 may transmit the time domain waveform to a receiver, where the transmitted time domain waveform contains one or more repetitions of the TTI. The operations of 1720 may be performed according to the methods described herein. In some examples, aspects of the operations of 1720 may be performed by a transmission manager as described with reference to FIGS. 9 through 12.

At 1725 the UE 115 may identify a configuration for a repetition period for the one or more repetitions of the TTI, where the repetition period is temporally misaligned with another repetition period of another UE. The operations of 1725 may be performed according to the methods described herein. In some examples, aspects of the operations of 1725 may be performed by a configuration manager as described with reference to FIGS. 9 through 12.

Figure 18:
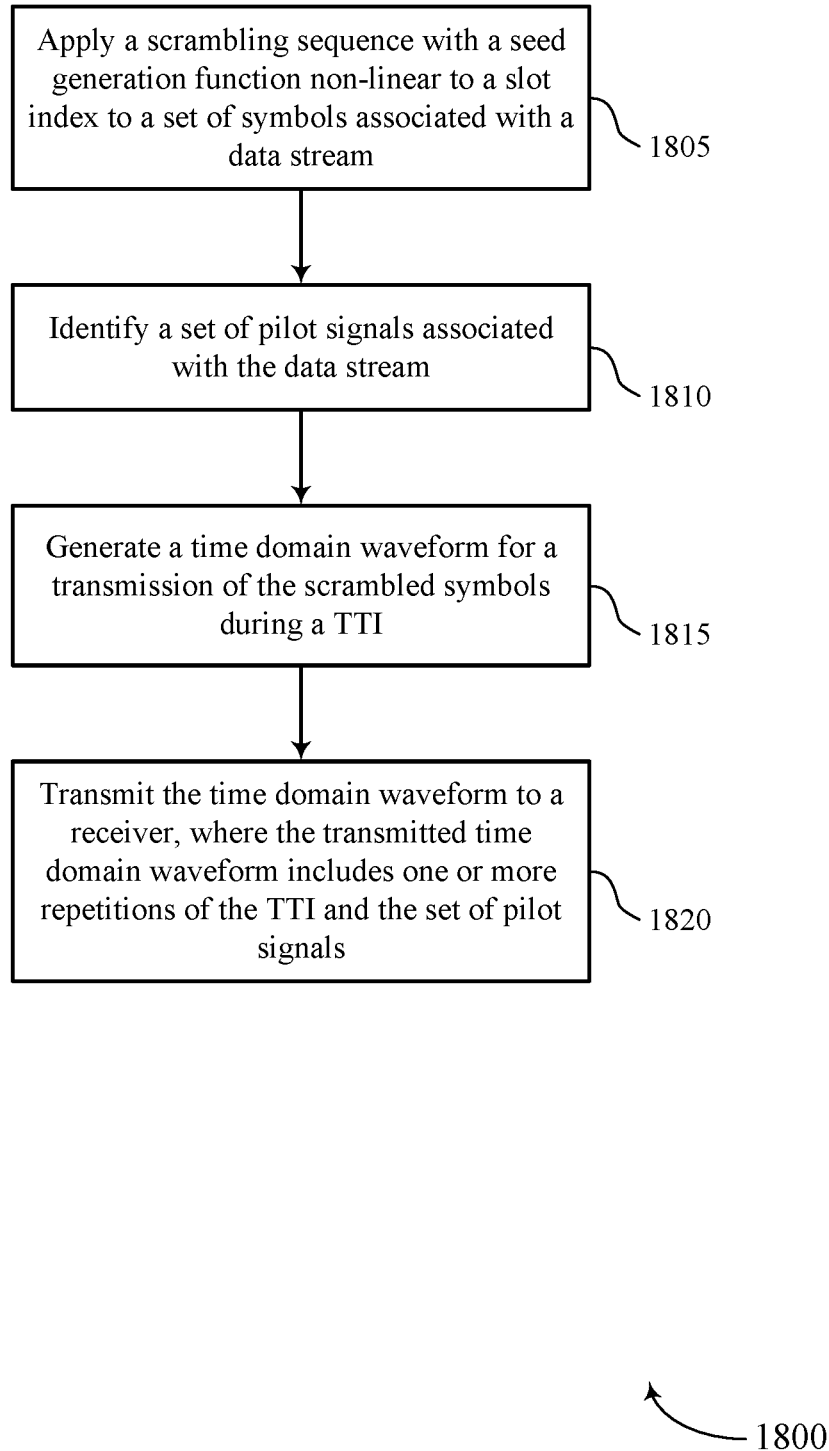

FIG. 18 shows a flowchart illustrating a method 1800 for NOMA techniques for NB-IoT and MTC in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE 115 may execute a set of codes to control the functional elements of the device to perform the functions described herein. Additionally, or alternatively, the UE 115 may perform aspects of the functions described herein using special-purpose hardware.

At 1805 the UE 115 may apply a scrambling sequence with a seed generation function non-linear to a slot index to a set of symbols associated with a data stream. The operations of 1805 may be performed according to the methods described herein. In some examples, aspects of the operations of 1805 may be performed by a scrambling component as described with reference to FIGS. 9 through 12.

At 1810 the UE 115 may identify a set of pilot signals associated with the data stream. The operations of 1810 may be performed according to the methods described herein. In some examples, aspects of the operations of 1810 may be performed by a pilot signal manager as described with reference to FIGS. 9 through 12.

At 1815 the UE 115 may generate a time domain waveform for a transmission of the scrambled symbols during a transmission time interval (TTI). The operations of 1815 may be performed according to the methods described herein. In some examples, aspects of the operations of 1815 may be performed by a waveform generation component as described with reference to FIGS. 9 through 12.

At 1820 the UE 115 may transmit the time domain waveform to a receiver, where the transmitted time domain waveform contains one or more repetitions of the TTI and the set of pilot signals. The operations of 1820 may be performed according to the methods described herein. In some examples, aspects of the operations of 1820 may be performed by a transmission manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency-division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS).

LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   performing rate matching for a set of symbols associated with a data stream for a transmission during a transmission time interval (TTI);
   applying a scrambling sequence to the rate-matched symbols;
   generating a time domain waveform for the transmission of the scrambled and rate-matched symbols; and
   transmitting the time domain waveform to a receiver, wherein the transmitted time domain waveform comprises one or more repetitions of the TTI and a set of pilot signals.

2. The method of claim 1,
   wherein respective pilot signals of the set of pilot signals comprise different cyclically shifted versions of a base pilot signal based at least in part on a configured cyclic shift index.

3. The method of claim 2, further comprising:
   applying a time domain orthogonal cover code to the set of pilot signals based at least in part on a resource allocation for the transmission of the time domain waveform.

4. The method of claim 2, wherein the set of pilot signals comprises demodulation reference signals (DMRSs).

5. The method of claim 1, wherein the scrambling sequence comprises a scrambling sequence with a seed generation function non-linear to a slot index to the set of symbols, the method further comprising:
   identifying the set of pilot signals associated with the data stream.

6. The method of claim 5, wherein respective pilot signals of the set of pilot signals comprise different cyclically shifted versions of a base pilot signal based at least in part on a cyclic shift index.

7. The method of claim 1, further comprising:
   determining a number of TTIs per transport block (TB) for transmitting the one or more repetitions of the TTI, the number of TTIs per TB used for a coarse alignment of the transmitted time domain waveform.

8. The method of claim 1, further comprising:
   identifying a configuration for a repetition period for the one or more repetitions of the TTI, wherein the repetition period is temporally misaligned with another repetition period of another UE.

9. The method of claim 1, further comprising:
   modulating the data stream using $\pi/2$-binary phase-shift keying (BPSK).

10. The method of claim 1, further comprising:
    transmitting the time domain waveform using one or more spatial layers.

11. The method of claim 1, further comprising:
    identifying a configuration of a repetition period and a TTI bundle size for the one or more repetitions of the TTI, wherein the TTI comprises a subframe.

12. The method of claim 1, further comprising:
    identifying a configuration for a resource unit (RU) size, a number of RUs, and a number of repetitions for one or more repetitions of an RU, wherein the TTI comprises the number of RUs.

13. The method of claim 1, further comprising:
    determining a number of TTIs per transport block (TB) for transmitting the one or more repetitions of the TTI, the TB size used for a coarse alignment of the transmitted time domain waveform.

14. The method of claim 1, wherein the TTI comprises one of a subframe or an orthogonal frequency division multiplexed (OFDM) symbol period.

15. The method of claim 1, further comprising:
    spreading each symbol of the set of symbols prior to generating a frequency domain waveform, wherein the time domain waveform is generated based on the frequency domain waveform.

16. The method of claim 1, wherein applying the scrambling sequence to the rate-matched symbols comprises:
    applying respective portions of the scrambling sequence to respective symbols groups of the set of symbols.

17. The method of claim 1, further comprising:
    identifying one or more time frequency resources for transmitting the time domain waveform without receiving a resource grant for the one or more time frequency resources; and
    transmitting the time domain waveform on the one or more time frequency resources.

18. The method of claim 17, further comprising:
    refraining from performing an initial access procure for transmitting on the one or more time frequency resources, wherein the one or more time frequency resources are identified in an absence of timing advance information from a base station.

19. The method of claim 17, wherein the time domain waveform comprises a preamble portion and a data portion.

20. The method of claim 19, further comprising:
    transmitting one or more demodulation reference signals (DMRSs) in the data portion of the time domain waveform.

21. An apparatus for wireless communication, comprising:
    a processor;
    memory in electronic communication with the processor; and
    instructions stored in the memory and executable by the processor to cause the apparatus to:
    perform rate matching for a set of symbols associated with a data stream for a transmission during a transmission time interval (TTI);

apply a scrambling sequence to the rate-matched symbols;
generate a time domain waveform for the transmission of the scrambled and rate-matched symbols; and
transmit the time domain waveform to a receiver, wherein the transmitted time domain waveform comprises one or more repetitions of the TTI and a set of pilot signals.

22. The apparatus of claim 21, wherein respective pilot signals of the set of pilot signals comprise different cyclically shifted versions of a base pilot signal based at least in part on a configured cyclic shift index, wherein the set of pilot signals comprises demodulation reference signals (DMRSs).

23. The apparatus of claim 22, wherein the instructions are further executable by the processor to cause the apparatus to:
apply a time domain orthogonal cover code to the set of pilot signals based at least in part on a resource allocation for the transmission of the time domain waveform.

24. The apparatus of claim 22, wherein the scrambling sequence comprises a scrambling sequence with a seed generation function non-linear to a slot index to the set of symbols.

25. The apparatus of claim 21, wherein the instructions are further executable by the processor to cause the apparatus to:
determine a number of TTIs per transport block (TB) for transmitting the one or more repetitions of the TTI, the number of TTIs per TB used for a coarse alignment of the transmitted time domain waveform.

26. The apparatus of claim 21, wherein the instructions are further executable by the processor to cause the apparatus to:
identify a configuration for a repetition period for the one or more repetitions of the TTI, wherein the repetition period is temporally misaligned with another repetition period of another UE.

27. The apparatus of claim 21, wherein the instructions are further executable by the processor to cause the apparatus to:
transmit the time domain waveform using one or more spatial layers.

28. The apparatus of claim 21, wherein the instructions are further executable by the processor to cause the apparatus to:
identify one or more time frequency resources for transmitting the time domain waveform without receiving a resource grant for the one or more time frequency resources; and
transmit the time domain waveform on the one or more time frequency resources.

29. An apparatus for wireless communication at a user equipment (UE), comprising:
means for generating a set of modulated symbols associated with a data stream for a transmission during a transmission time interval (TTI);
means for spreading each symbol of the set of modulated symbols in accordance with a spreading factor;
means for applying a scrambling sequence to the spread symbols;
means for generating a time domain waveform for the transmission of the scrambled and spread symbols; and
means for transmitting the time domain waveform to a receiver, the transmitted time domain waveform comprising one or more repetitions of the TTI and a set of pilot signals, wherein the transmission of the time domain waveform is synchronized with transmissions of other UEs.

30. A non-transitory computer-readable medium storing code for wireless communication, the code comprising instructions executable by a processor to:
apply a scrambling sequence with a seed generation function non-linear to a slot index to a set of symbols associated with a data stream;
identify a set of pilot signals associated with the data stream;
generate a time domain waveform for a transmission of the scrambled symbols during a transmission time interval (TTI); and
transmit the time domain waveform to a receiver, wherein the transmitted time domain waveform comprises one or more repetitions of the TTI and the set of pilot signals.

* * * * *